United States Patent
Khandekar

(10) Patent No.: US 9,443,005 B2
(45) Date of Patent: Sep. 13, 2016

(54) SYSTEMS AND METHODS FOR NATURAL LANGUAGE PROCESSING

(71) Applicant: Pramod Khandekar, South Plainfield, NJ (US)

(72) Inventor: Pramod Khandekar, South Plainfield, NJ (US)

(73) Assignee: INSTAKNOW.COM, INC., Edison, NJ (US)

( * ) Notice: Subject to any disclaimer, the term of this patent is extended or adjusted under 35 U.S.C. 154(b) by 308 days.

(21) Appl. No.: 14/098,787

(22) Filed: Dec. 6, 2013

(65) Prior Publication Data

US 2014/0316768 A1    Oct. 23, 2014

Related U.S. Application Data

(60) Provisional application No. 61/737,251, filed on Dec. 14, 2012.

(51) Int. Cl.
G06F 17/27    (2006.01)
G06F 17/30    (2006.01)

(52) U.S. Cl.
CPC .............................. *G06F 17/30654* (2013.01)

(58) Field of Classification Search
None
See application file for complete search history.

(56) References Cited

U.S. PATENT DOCUMENTS

| | | | | |
|---|---|---|---|---|
| 2002/0132607 A1* | 9/2002 | Castell | ............ | H04L 63/0227 455/412.2 |
| 2002/0198697 A1* | 12/2002 | Datig | ............ | G06N 3/004 704/1 |
| 2004/0006559 A1* | 1/2004 | Gange | ............ | G06F 17/3053 |
| 2009/0287678 A1* | 11/2009 | Brown | ............ | G06F 17/30654 |
| 2009/0292687 A1* | 11/2009 | Fan | ............ | G06F 17/30654 |
| 2011/0078192 A1* | 3/2011 | Murdock, IV | .... | G06F 17/30654 707/780 |
| 2011/0123967 A1* | 5/2011 | Perronnin | ............ | G09B 7/02 434/178 |
| 2011/0125734 A1* | 5/2011 | Duboue | ............ | G09B 7/00 707/723 |
| 2011/0307440 A1* | 12/2011 | Panchenko | ............ | G06F 17/30575 707/600 |
| 2012/0078888 A1* | 3/2012 | Brown | ............ | G06F 17/30654 707/723 |
| 2012/0078889 A1* | 3/2012 | Chu-Carroll | ............ | G06F 17/30654 707/723 |
| 2012/0078891 A1* | 3/2012 | Brown | ............ | G06F 17/30654 707/723 |
| 2012/0084293 A1* | 4/2012 | Brown | ............ | A61B 5/00 707/741 |
| 2012/0301864 A1* | 11/2012 | Bagchi | ............ | G09B 7/02 434/362 |
| 2013/0006641 A1* | 1/2013 | Brown | ............ | G06F 17/30654 704/270.1 |
| 2013/0173256 A1* | 7/2013 | Eggebraaten | ............ | G06F 17/28 704/9 |
| 2013/0262107 A1* | 10/2013 | Bernard | ............ | G06F 17/2785 704/235 |
| 2013/0325439 A1* | 12/2013 | Fink | ............ | G06F 17/2755 704/9 |

* cited by examiner

*Primary Examiner* — Richemond Dorvil
*Assistant Examiner* — Thuykhanh Le
(74) *Attorney, Agent, or Firm* — Preston Smirman; Smirman IP Law, PLLC

(57) ABSTRACT

Methods, systems and computer programs for automatic, highly accurate machine comprehension of a plurality of segments of free form unstructured text in a natural language. The system answers a plurality of complex, free-form questions asked in a natural language, based on the totality of input text. The system further uses a multi-dimensional data model to measure the total effects of actions/verbs acting on various unique nouns present in the input text. The system may convert the questions into another multi-dimensional data model and may then compare the two data models in program memory to derive the answers to the posed questions. The system may then automatically detect unknown words and optionally look them up in digital information sources, such as online dictionaries and encyclopedias, to fill in the gaps in knowledge to answer the questions with expert-like reliability.

24 Claims, 7 Drawing Sheets

TEXT

Specimen A was taken from the right mental nerve, was collected by biopsy, and was diagnosed as nerve, negative for malignancy.

Specimen B was taken from the right buccal cavity, gum, and mandible. Specimen B was collected by composite resection and was diagnosed as invasive poorly differentiated squamous cell carcinoma. Site of involvement was right buccalcavity. Histologic grade was poorly differentiated. The pattern of invasion was infiltrative. Extent of invasion was invading into underlying skeletal muscle for distance of 0.4 em. Tumor did not invade into underlying bone. All mucosal margins and bone margins were negative for malignancy. Focal area of dysplasia was present. Angiolymphatic invasion was not identified. Perineural invasion was present.

Specimen C was taken from the right selective neck and was collected by lymph node dissection. Specimen C Level IA was diagnosed as metastatic carcinoma involving one node of eight lymph nodes. The lymph node measured 2.5 em and no extracapsular tumor expansion was identified. Specimen C Level 2 was diagnosed as sixteen lymph nodes, negative for malignancy. Specimen C Level 3 was diagnosed as six lymph nodes, negative for malignancy. Specimen C Level 4 was diagnosed as seven lymph nodes, negative for malignancy.

QUESTION

ANSWER        Answer Question

FIG - 4

| Options | Help |

TEXT

Specimen A was taken from the right mental nerve, was collected by biopsy, and was diagnosed as nerve, negative for malignancy.

Specimen B was taken from the right buccal cavity, gum, and mandible. Specimen B was collected by composite resection and was diagnosed as invasive poorly differentiated squamous cell carcinoma. Site of involvement was right buccalcavity. Histologic grade was poorly differentiated. The pattern of invasion was infiltrative. Extent of invasion was invading into underlying skeletal muscle for distance of 0.4 cm. Tumor did not invade into underlying bone. All mucosal margins and bone margins were negative for malignancy. Focal area of dysplasia was present. Angiolymphatic invasion was not identified. Perineural invasion was present.

Specimen C was taken from the right selective neck and was collected by lymph node dissection. Specimen C Level IA was diagnosed as metastatic carcinoma involving one node of eight lymph nodes. The lymph node measured 2.5 cm and no extracapsular tumor expansion was identified. Specimen C Level 2 was diagnosed as sixteen lymph nodes, negative for malignancy. Specimen C Level Specimen C Level 3 was diagnosed as six lymph nodes, negative for malignancy. Specimen C Level 4 was diagnosed as seven lymph nodes, negative for malignancy.

QUESTION →
Was specimen B diagnosed as malignant?

[ Answer Question ]

ANSWER

*FIG - 5*

TEXT

Specimen A was taken from the right mental nerve, was collected by biopsy,and was diagnosed as nerve,negative for malignancy.

Specimen B was taken from the right buccal cavity, gum,and mandible. Specimen B was collected by composite resection and was diagnosed as invasive poorly differentiated squamous cell carcinoma. Site of involvement was right buccalcavity. Histologic grade was poorly differentiated. The pattern of invasion was infiltrative. Extent of invasion was invading into underlying skeletal muscle for distance of 0.4 cm. Tumor did not invade into underlying bone. All mucosal margins and bone margins were negative for malignancy. Focal area of dysplasia was present. Angiolymphatic invasion was not identified. Perineural invasion was present.

Specimen C was taken from the right selective neck and was collected by lymph node dissection. Specimen C Level IA was diagnosed as metastatic carcinoma involving one node of eight lymph nodes. The lymph node measured 2.5 cm and no extracapsular tumor expansion was identified. Specimen C Level 2 was diagnosed as sixteen lymph nodes, negative for malignancy. Specimen C Level C Level 3 was diagnosed as six lymph nodes,negative for malignancy. Specimen C Level 4 was diagnosed as seven lymph nodes, negative for malignancy.

QUESTION

Was specimen B diagnosed as malignant?

Answer Question

ANSWER

Options   Help

TEXT parsed in 58.08 seconds

Specimen A was taken from the right mental nerve, was collected by biopsy, and was diagnosed as nerve, negative for malignancy.

Specimen B was taken from the right buccal cavity, gum, and mandible. Specimen B was collected by composite resection and was diagnosed as invasive poorly differentiated squamous cell carcinoma. Site of involvement was right buccalcavity. Histologic grade was poorly differentiated. The pattern of invasion was infiltrative. Extent of invasion was invading into underlying skeletal muscle for distance of 0.4 cm. Tumor did not invade into underlying bone. All mucosal margins and bone margins were negative for malignancy. Focal area of dysplasia was present. Angiolymphatic invasion was not identified. Perineural invasion was present.

Specimen C was taken from the right selective neck and was collected by lymph node dissection. Specimen C Level IA was diagnosed as metastatic carcinoma involving one node of eight lymph nodes. The lymph node measured 2.5 cm and no extracapsular tumor expansion was identified. Specimen C Level 2 was diagnosed as sixteen lymph nodes, negative for malignancy. Specimen C Level 3 was diagnosed as six lymph nodes, negative for malignancy. Specimen C Level 4 was diagnosed as seven lymph nodes, negative for malignancy.

QUESTION parsed in 0.63 seconds

Was specimen B diagnosed as malignant?

[ Answer Question ]

ANSWER
TRUE

SYSTEMS AND METHODS FOR NATURAL LANGUAGE PROCESSING

CROSS-REFERENCE TO RELATED APPLICATION

The instant application claims priority to U.S. Provisional Patent Application Ser. No. 61/737,251 filed Dec. 14, 2012, pending, the entire specification of which is expressly incorporated herein by reference.

FIELD OF THE INVENTION

The present invention relates generally to natural language processing, and more particularly, to utilizing free form natural text from multiple sources to automatically answer complex questions, and to convert unstructured text into its structured equivalent and to generate intelligent summaries.

BACKGROUND OF THE INVENTION

Rapid hardware and software advances have made it possible to process massive amounts of data since the 1980s. However, these advances work well only when processing "well-described" and "well-structured" data.

Software that reads and "comprehends" complex, free-form, unstructured data has been researched extensively since the advent of computers in 1960s. This area has been a subset of Artificial Intelligence research referred to as NLP (Natural Language Processing) and NLI (Natural Language Inference).

More recently, using the distributed global data sharing capabilities of the Internet as "The Semantic Web" for meaningful understanding and usage of wide spread information has also been pursued (dubbed "Web 3.0") but as yet unfulfilled, because it requires information to be published with additional complicated technical information.

Gartner, a leading IT analyst firm, has estimated that 40 Exabytes (4×10 19 bytes) of new information was generated in 2009, with 80% of that being unstructured, thus, making it hard for current computers to understand and use it. The raw/unstructured information on the Internet continues to grow at a very fast pace for the foreseeable future. Much of it requires human processing because computers cannot comprehend the meaning imparted by text.

An intelligent computer program that can use comprehension (understanding of meaning) advances to process this huge amount of text data will provide benefits in finding, using, re-structuring, auditing and saving important information in a context-specific and reason-specific manner.

The current state of art in automated text processing is limited in several ways, such as:

(1) keyword matching for searches;
(2) synonym matching;
(3) part-of-speech (syntax) determination—tagging verbs, nouns, adjectives, etc.;
(4) taxonomy, which may be considered categorizing text topics in one or more hierarchies for easier retrieval;
(5) ontology, which may be considered the determination of concepts mentioned in the text and creating a concept link map;
(6) proximity based heuristic or probabilistic interpretation of "logic" operators, i.e., "not", "and", "or," which generally do not work well with complex sentences; and
(7) various combinations of the well-known NLP lexical analysis approaches, e.g., tokenization, sentence boundary detection, abbreviation expansion, normalization, part-of-speech (POS) tagger, noun phrase extraction, concept extraction, named entity recognition, relation extraction, quantifier detection and anaphora resolution.

Many universities and corporations have spent significant efforts to build intelligent software that can provide "semantic" or "meaning-based" language processing capabilities with trained-user-like accuracy, to no avail so far. Currently the human brain can easily surpass even the most sophisticated computer in "understanding" the meaning of even medium complexity text in a natural language.

There are at least eight basic deficiencies in today's natural language processing. Examples of these deficiencies include:

(1) Computers today are unable to link meaning of various words to each other in a complex sentence to derive the complete, multi-faceted meaning of the sentence in an accurate and reliable manner. Part of this inability lies in the complexity involved in "disambiguating" the correct meaning out of multiple possible meanings of a word or phrase and "linking" that meaning to the correct OTHER words in the sentence. Disambiguating, or more specifically, disambiguation of text, involves the ability to determine the author-intended meaning of a word or phrase among all possible meanings of that word or phrase. Linking, or more specifically linking of text, involves, for each word or phrase in a sentence, the ability to determine other words and phrases in the current, prior or following sentences to which the word or phrase relates as intended by the author/originator of the text; and to determine the type of author-intended semantic (i.e., intended-meaning) relationships among such words. This feature is referred to herein as "Advanced Disambiguation and Linking";

(2) Computers today have no framework for semantic placement of meaning of words, phrases and sentences, so that various combinations of meanings can be compared with each other to understand complex references to already mentioned objects and to logically answer questions, e.g., a computer does not know that "the hill to the left of the river" may also be referred to as "the hill having the river to its right" in a subsequent sentence. Computers today also do not understand conditionality in natural language, e.g., IF, ELSE, OTHERWISE, ONLY IF, etc. This feature is referred to herein as "Logical Comprehension";

(3) Computers today cannot derive even simple real-life inferences that humans take for granted, e.g., there is no automatic way for a computer to know that when a car travels faster, it takes less time to reach its destination. This feature is referred to herein as "Inference from Laws of Nature" or "Common Sense";

(4) Computers today cannot understand or comprehend meaning of multiple complex sentences (referred to as "discourse intelligence" in linguistics) and apply it to answer complex questions in an accurate and reliable manner. This feature is referred to herein by its common linguistics name of "Discourse Intelligence";

(5) Computers today cannot "learn" new (i.e., not previously encountered) words and phrases, understand them and start using them to answer questions. For example, a computer that has not encountered the word "Alaska" does not know that Alaska is a state in the United States of America, and its other descriptive attributes. A human can readily look up the definition of the word "Alaska" in a dictionary and use that additional information for a useful purpose but a computer cannot absorb and use new words from their definitions from electronic dictionaries. This feature is referred to herein as "Vocabulary Learning";

(6) Computers today cannot "learn" new (i.e., not previously encountered) descriptive information about words and phrases that they do know. For example, a computer that does know the word "Lunar Eclipse," cannot look up additional information about "Lunar Eclipse" from a reliable source like an electronic encyclopedia. An example of an electronic encyclopedia is the website wikipedia.org, which describes a "Lunar Eclipse" as when "the Moon passes directly behind the Earth into its umbra (shadow). This can occur only when the Sun, Earth, and Moon are aligned exactly, or very closely so, with the Earth in the middle. Hence, a lunar eclipse can only occur the night of a full moon." A human can readily read about a lunar eclipse and use that additional information for a useful purpose but a computer cannot absorb and use new information. This feature is referred to herein as "World Knowledge Learning";

(7) Computers today cannot easily understand the context or environment under which any given natural text is to be evaluated. For example, the sentence "John is strong" may mean a good thing if John is our friend, but a bad thing if John is our enemy. Similarly, computers today cannot adapt to different contexts on demand to evaluate the importance of information in natural language text (wherein natural language text is generally defined as any text content (e.g., words, phrases, clauses, sentences, paragraphs, chapters, pages, books, articles, etc.) composed by a person or a machine in any spoken or written natural language to document, express or convey a description of past, present or future thoughts, events, emotions, experiences or beliefs regarding any topic, the topics being real or imaginary, tangible or intangible from various contexts). This feature is referred to herein as "Context Switching"; and (8) Computers today cannot comprehend and answer complex questions asked in natural language by users or other computer systems, because that in turn requires Advanced Disambiguation and Linking, Logical Comprehension, Inference from Laws of Nature, Discourse Intelligence, Vocabulary Learning, World Knowledge Learning and Context Switching. This feature is referred to herein as "Advanced Answering."

Therefore, it would be advantageous to provide new and improved methods, systems and computer programs for natural language processing, that overcome at least one of the aforementioned problems.

SUMMARY OF THE INVENTION

The present invention provides for methods, systems and computer program products that may receive one or more inputs from a client (e.g., user, client device, calling program, etc.), which may include:

(1) Input text to be used to answer questions. Input text, as that phrase is used herein, is meant to include any natural language text made available to the present invention for processing by the present invention's capabilities as described herein. The input text may originate from multiple sources and may contain multiple and complex sentences, paragraphs, articles;

(2) One or more questions to be answered based on the input text; and/or (3) Processing options, such as, preferred electronic dictionaries, encyclopedias to look up information when needed, and other such processing options.

The disclosed systems and methods may process the input text and the questions, and then may provide the client:

(1) The answers to the questions in natural language; and/or (2) A justification for the answer, i.e., an explanation of which parts of the input text (sentences and words) were the reason for the derived answer (This feature is referred to herein as the "evidence profile").

As used herein, the term "word" may include references to single words (e.g., "car, "humongous", "annihilate", "FBI") as well as "phrasal words" that have a unique meaning when taken together (e.g., "heart attack", "black sheep", ill-gotten", "awe-inspiring", "US President John F. Kennedy", "U. N.", etc.).

In one embodiment of the disclosed method, the method includes receiving an input text, the input text comprising a first plurality of words, disambiguating the received input text into a second plurality of words, linking the second plurality of words based on the disambiguation, and providing an answer to a question regarding the received input text based on the linking.

Words in every sentence are linked to each other in an author-intended manner as per the used natural language syntax, in effect linking the scales of one word to the scales of other words to provide the author-intended meaning of the entire sentence, as well as multiple sentences. The word "scale," as used herein, is meant to include any frame of reference for a particular property or attribute that may belong to any object (noun), such properties or attributes being affected by meaning of other prepositions, adjectives, adverbs, idioms and actions (verbs) to allow the reader to understand the author-intended meaning. Across multiple words in the sentence, the links form a network of interrelated words and their scales. As used herein, the term "Scale-Web" refers to this network of interrelated words and their scales, e.g., in one or multiple sentences, that allows the reader to understand the author-intended meaning.

In another embodiment of the method, the method includes receiving an input text, the input text comprising a conditional statement (wherein a conditional statement, as used herein, is meant to include any natural language text documenting, expressing or conveying dependency of thoughts, events, emotions, experiences or beliefs on any other thoughts, events, emotions, experiences or beliefs), applying a predetermined scale to the received input text to obtain a conditional scale-web based on the conditional statement, and providing an answer to a question regarding the conditional statement based on the obtained conditional scale-web.

In a further embodiment of the method, the method includes receiving an input text, the input text comprising a plurality of words, applying a predetermined scale to the received input text to obtain a scale-web of the received input text, applying a predefined common sense rule (wherein the phrase common sense rule, as used herein, is meant to include an understanding, supposition or assumption based on a basic ability to perceive, understand and judge things, which is shared by ("common to") nearly all people, and can be reasonably expected of nearly all people without any need for debate) to the predetermined scale to modify the obtained scale-web, and providing an answer to a question regarding the received input text based on the application of the predefined common sense rule and the modified scale-web.

In yet another embodiment of the method, the method includes receiving an input text, the input text comprising a plurality of sentences, applying a plurality of predetermined scales to the plurality of sentences to obtain a scale-web of the input text, wherein the scale-web of the input text links the words of the plurality of sentences, and providing an answer to a question regarding the input text, the answer being based on the obtained scale-web of the input text.

In yet a further embodiment of the method, the method includes receiving an input text, the input text comprising a plurality of words, identifying that at least one word of the plurality of words is an unknown word (wherein the phrase unknown word, as used herein, is meant to include any word, phrase or clause not previously processed by the present invention's capabilities as described herein), referencing an information source to obtain a meaning of the at least one word, and incorporating the meaning of the at least one word into the received input text. The meaning of the at least one word may be obtained from a dictionary, an encyclopedia, or other such source. The meaning of the at least one word may further include information related to the at least one word (e.g., the at least one word may be "Alaska," and the meaning of the word "Alaska" may include information about the state of Alaska.).

In another embodiment of the method, the method may include receiving an input text, the input text comprising a plurality of words, determining a first fact from the received input text based on a first context, the first context defined by a plurality of rules, altering at least one rule of the plurality of rules to obtain a second context, the second context being different than the first context, determining a second fact from the received input text based on the second context, and providing an answer to a question regarding the input text based on the first fact and the second fact.

In a further embodiment of the method, the method may include receiving an input text comprising a plurality of sentences, receiving an input question (the phrase input question, as used herein, is meant to include any natural language question made available to the present invention for processing by the present invention's capabilities as described herein) regarding the received input text, applying a first scale to the received input text to obtain a first scale-web of the input text, applying a second scale to the received input question to obtain a second scale-web of the input question, and providing an answer to the received input question based on a comparison of the first scale-web with the second scale-web.

In accordance with a first exemplary embodiment of the present invention, a method for natural language processing is provided, comprising the steps of:
providing a computer processor unit;
providing a non-transitory computer readable medium operably associated with the computer processor unit, the non-transitory computer readable medium storing instructions executable by the computer processor unit to perform the steps of:
receiving an input text, the input text comprising a first plurality of words;
disambiguating the received input text into a second plurality of words;
linking the second plurality of words based on the disambiguation; and
providing an answer to a question regarding the received input text based on the linking.

In accordance with a second exemplary embodiment of the present invention, a method for natural language processing is provided, comprising the steps of:
providing a computer processor unit;
providing a non-transitory computer readable medium operably associated with the computer processor unit, the non-transitory computer readable medium storing instructions executable by the computer processor unit to perform the steps of:
receiving an input text, the input text comprising a plurality of sentences;
applying a plurality of predetermined scales to the plurality of sentences to obtain a scale-web of the input text, wherein the scale-web of the input text links the words of the plurality of sentences; and
providing an answer to a question regarding the input text, the answer being based on the obtained scale-web of the input text.

In accordance with a third exemplary embodiment of the present invention, a method for natural language processing is provided, comprising the steps of:
providing a computer processor unit;
providing a non-transitory computer readable medium operably associated with the computer processor unit, the non-transitory computer readable medium storing instructions executable by the computer processor unit to perform the steps of:
receiving an input text comprising a plurality of words;
receiving an input question regarding the received input text;
applying a first scale to the received input text to obtain a first scale-web of the input text;
applying a second scale to the received input question to obtain a second scale-web of the input question; and
providing an answer to the received input question based on a comparison of the first scale-web with the second scale-web.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 illustrates a screen capture of a screen wherein the free form has been entered into the text box (as indicated by the arrow) of the computer program implementing various aspects of the present invention;

FIG. 5 illustrates a screen capture of a screen wherein a free form question has been entered into a question box (as indicated by the arrow) of the computer program implementing various aspects of the present invention;

FIG. 6 illustrates a screen capture of a screen wherein an "answer question" key has been actuated (as indicated by the arrow) of the computer program implementing various aspects of the present invention; and FIG. 7 illustrates a screen capture of an answer to the question (posed in FIG. 5) displayed in an answer box (as indicated by the arrow) of the computer program implementing various aspects of the present invention.

The same reference numerals refer to the same parts throughout the various FIGS.

DETAILED DESCRIPTION OF THE INVENTION

The aspects, features and advantages of the present invention will be appreciated when considered with reference to the following description of preferred embodiments and accompanying figures. The following description does not limit the present invention. Rather, the scope is defined by the appended claims and equivalents.

While certain processes in accordance with example embodiments are shown in the figures as occurring in a linear fashion, this is not a requirement unless expressly stated herein. Different processes may be performed in a different order or concurrently.

Figure 1:
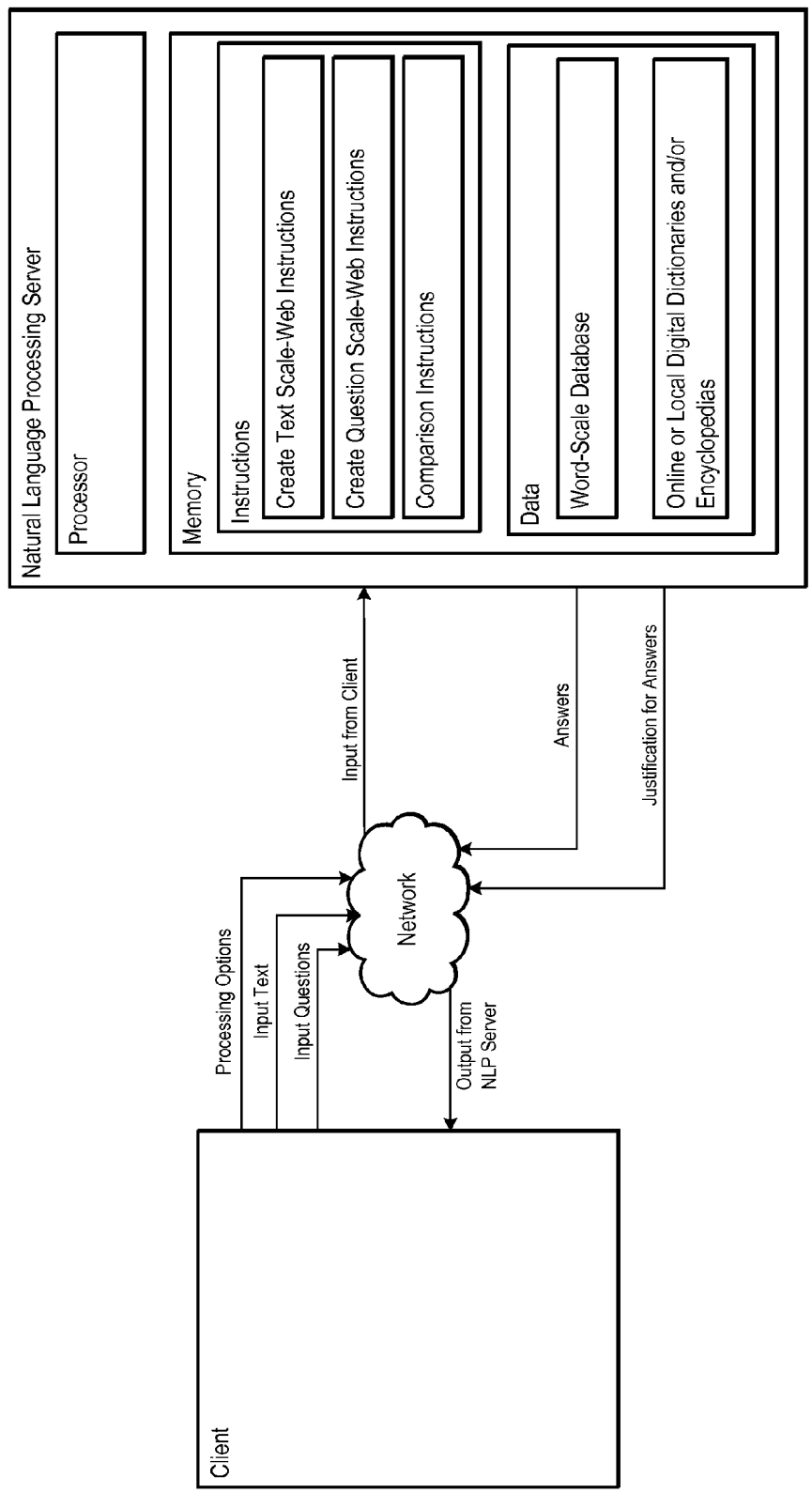
FIG. 1 illustrates an exemplary schematic view of a system for natural language processing according to various aspects of the present invention.

Referring to FIG. 1, there is shown an exemplary schematic view of a system for natural language processing according to various aspects of the present invention.

In some applications, the present invention described herein may be provided as elements of an integrated software system, in which the features may be provided as separate elements of a computer program. Some embodiments may be implemented, for example, using a computer-readable storage medium (e.g., non-transitory) or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the features described herein need be provided or need be provided as separate units. Additionally, it is noted that the arrangement of the features do not necessarily imply a particular order or sequence of events, nor are they intended to exclude other possibilities. For example, the features may occur in any order or substantially simultaneously with each other. Such implementation details are immaterial to the operation of the present invention unless otherwise noted herein.

The exemplary methods and computer program instructions may be embodied on a computer readable storage medium (e.g., non-transitory) that may include any medium that can store information. Examples of a computer readable storage medium (e.g., non-transitory) include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

Furthermore, a software program embodying the features of the present invention may be used in conjunction with a computer device. Examples of a computing device may include, but are not limited to, an electronic book reading device, a computer workstation, a terminal computer, a server computer, a handheld device (e.g., a tablet computer, a personal digital assistant "PDA", a mobile telephone, a Smartphone, etc.), a web appliance, a network router, a network switch, a network bridge, any machine capable of executing a sequence of instructions that specify an action to be taken by that machine, and any combinations thereof. In one example, a computing device may include and/or be included in, a kiosk.

The computer device may also include an input device. In one example, a user of the computer device may enter commands and/or other information into computer device via an input device. Examples of an input device may include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. The input device may be interfaced to bus via any of a variety of interfaces including, but not limited to, a serial interface, a parallel interface, a game port, a USB interface, a FIREWIRE interface, a direct interface to bus, and any combinations thereof. The input device may include a touch screen interface that may be a part of or separate from the display.

A user may also input commands and/or other information to the computer device via a storage device (e.g., a removable disk drive, a flash drive, etc.) and/or a network interface device. A network interface device, such as network interface device may be utilized for connecting the computer device to one or more of a variety of networks, such as a network, and one or more remote devices connected thereto. Examples of a network interface device may include, but are not limited to, a network interface card (e.g., a mobile network interface card, a LAN card), a modem, and any combination thereof. Examples of a network may include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software, etc.) may be communicated to and/or from the computer device via a network interface device.

The computer device may further include a video display adapter for communicating a displayable image to a display device, such as a display device. Examples of a display device may include, but are not limited to, a liquid crystal display (LCD), a cathode ray tube (CRT), a plasma display, a light emitting diode (LED) display, and any combinations thereof. In addition to a display device, the computer device may include one or more other peripheral output devices including, but not limited to, an audio speaker, a printer, and any combinations thereof. Such peripheral output devices may be connected to a bus via a peripheral interface. Examples of a peripheral interface may include, but are not limited to, a serial port, a USB connection, a FIREWIRE connection, a parallel connection, and any combinations thereof.

While the disclosed embodiments may be written in VB.NET programming technology, one or more of these embodiments may be replicated in any other well-known programming technology such as, but not limited to JAVA, C#, PERL, and/or the like.

I. Feature Overview

The present invention provides for one or more methods, systems and computer programs that address the deficiencies mentioned above. These various embodiments may be used in thousands of different ways in many industries and problem solving areas. These embodiments employ the following features (which, when taken together, are referred within this document as "Semantics-Comprehension-NLP" for the sake of easy referencing):

(1) Accurately process and comprehend the semantics (meaning) of input text in a natural human language, without needing the user or another machine to change the text into technical formats to be used to answer questions;

(2) Accurately process and comprehend the semantics (meaning) of a question asked in a natural language, without needing the user or another machine to change the question into technical formats;

(3) Isolate and process required details from the totality of input text to answer precise as well as broad questions (e.g., did, is, who, when, where, why, by whom, to whom, whose, how, how much, how many, from whom, on what, what happened before, after whose action on the date, who gave the lecture where at least ten people attended, if John had not talked to Tom, would he still have gone to Boston, etc.) regardless of length of text to be scanned for the answer (e.g., multiple sentences, paragraphs, pages, books, volumes);

(4) Receive unstructured, free-form natural language text originating from multiple sources (e.g., the Internet, electronically-formatted documents, such as Word documents, .PDF documents, etc., user entered data on computer screens and hand-held devices or converted from voice inputs using speech-to-text technologies) and combine their meanings to answer one or more questions;

(5) Process and combine meaning of multiple sentences ("Discourse Intelligence") so an answer can be derived from the most complete information;

(6) Process and combine meaning of multiple sentences in a time-sequence (chronological) manner so questions can be answered after matching the time-scale of interest. Handle all variations of past, present and future tenses as well as meaning of before/after/since/till, etc.;

(7) Determine correct meanings of words that mean different things in different contexts, i.e., "disambiguate" word "senses" based on their author-intended semantic relationship to each other in a given sentence (referred to as "Domain Knowledge" in linguistics). For example, the word "set" may be used as a noun ("china set"), verb ("I set the table") or adjective ("The set concrete was hard"). As another example, the word "interest" has very different meanings in the following two sentences:
  (a) I have no interest in watching that movie; and
  (b) I received no interest from the checking account.

8) Correctly link pronouns to the objects they refer to:
  (a) Example 1
    (i) The window is a good way for the cat to enter when it is open; and
    (ii) The window is a good way for the cat to enter when it is hungry.
  (b) Example 2
    (i) The bus carried the team to the hotel on 11th Avenue when it was jammed with traffic. (It=11th Avenue);
    (ii) The bus carried the team to the hotel on 11th Avenue when it had a flat. (It=bus);
    (iii) The bus carried the team to the hotel on 11th Avenue after it had already closed. (It=hotel); and
    (iv) The bus carried the team to the hotel on 11th Avenue after it had won the afternoon game. (It=team).

(9) Correctly disambiguate and link prepositions:
  (a) I used water many times in my experiment as a solvent ("as" used to denote "similarity");
  (b) I used water many times in my experiment as a student ("as" used to denote "similarity"); and
  (c) I used water many times in my experiment as it evolved ("as" used to denote "at the same time").

(10) Correctly disambiguate part of speech (i.e. noun, verb, adjective, adverb, verb):
  (a) They expressed many views ("expressed" is a verb); and
  (b) The expressed package arrived in time ("expressed" is an adjective).

(11) Correctly separate noun chains into multiple nouns:
  (a) The draughts stop water people need. (The draughts stop water <which> people need)

(12) Correctly link words providing additional description to prior words:
  (a) The car near the garage door which was shut was red.
  (b) The car near the garage door which was idling was red.

(13) Correctly find phrasal verbs:
  (a) He stood by his opinions./He stood by the wall.

(14) Determine correct links between words. "Links" provide "additional description" of other nouns or verbs in the sentence. For example:
  (a) I cut the cake with a knife. The word "with" links (i.e., describes) the "knife" to the action "cut"; and
  (b) I cut the cake with a layer of icing. The word "with" links (i.e., describes) the "layer of icing" to the noun "cake."

(15) Correctly process synonyms, antonyms and anaphora of words and phrases;

(16) Correctly process adjectives, adverbs and idioms;

(17) Correctly process changes in meaning introduced by punctuation like commas, semi-colons and colons;

(18) Correctly process "Logic Based Comprehension" (explicit or implicit "If", "otherwise", "and", "or", "not", "always", "sometimes", "never", comparatives (_er), superlatives (_est), etc.) in both the data text and the question text and correctly apply it to answer questions;

(19) Accurately answer indirect questions based on "Inference from Laws of Nature":
  (a) Example: "I increased the car speed"; and
  (b) Question—"Did I arrive sooner?"—"Yes."

(20) Accurately use definitions of new words from electronic dictionaries ("Vocabulary Learning");

(21) Accurately answer indirect questions based on "World Knowledge":
  (a) Example: "I went to Alaska."; and
  (b) Question—"Was I in the largest state in the US by area?"—"Yes".

(22) Process "inheritance" of properties from a class (i.e., a "set" of similar elements) to its members:
  (a) Example: "All students in the summer special program failed the test. The program ran for three weeks. Mary did not attend the program. John attended the program."; and
  (b) Question—Who failed the test"?—"John" ("John" being member of the "set of students in the program".)

(23) Calculate arithmetic numbers based on information in natural language text:
  (a) Example: "Mary had three cars in 2000. In 2010 she has one car. How many cars did she dispose of?"

(24) Decide what is lacking/missing from the data that is preventing a reliable answer and look for the missing piece in additional text information (e.g., lookup an online or local electronic dictionary or encyclopedia or prompt a user to provide the missing information) and learn/comprehend it so the answer may be provided using accessible and/or available information. This is equivalent to a human user looking up a dictionary or an encyclopedia when dealing with previously unknown or unfamiliar information;

(25) Optionally save the newly acquired information and answers derived for current questions for future use, continually expanding the breadth and speed of problem solving capabilities;

(26) Be aware of one or more topics or domains of interest to any degree of specificity and recognize free form text as being related to that particular topic (i.e., determine taxonomy and ontology much more finely than possible with current state of art). For example, separate articles/news in "Incidents of sudden car acceleration that worried the car owner but did not cause an accident" and "Incidents of sudden car acceleration that worried the car owner and caused an accident";

(27) Convert unstructured text information into precise structured equivalent so it may be used by conventional computer systems that can process only well-structured data;

(28) Generate a gist or summary from totality of input text:
  (a) Based on a gist "slant" preference mentioned by a human user;
  (b) For example, create a gist focusing on changes in financial state from a company's quarterly report create a gist focusing on management changes from the same quarterly report; and
  (c) Without any "slant", i.e., gist of all salient information mentioned in the input text.

(29) Explain the rationale of the answer by highlighting or providing references to the underlying supporting information, i.e., references in input text that led to the answer. ("Evidence Profiling");

(30) Easily switch context of any given text simply by reading about the new context in natural language;

(31) Process text in any natural language, following that languages syntax and semantics rules; and

(32) Execute these features in an efficient manner to be practically useful in real-time, near-real-time and batch/background problem solving that needs precise answers to be gleaned from vast amounts of unstructured information.

II. Practical Applications

There are many practical applications of the foregoing features. Examples of such practical applications include:

(1) Fine tune Web and document search results by filtering out irrelevant search results and returning precise answers rather than Web page or document links. Users may ask very precise questions to search engines and find search results matching the precise question, regardless of word, phrase and even language differences. This disclosed features may assist in accurately answering precise, but complex, questions like:
  (a) "Is the current temperature in Moscow greater than the current temperature in New York?"
  (b) "How many US presidents died before reaching the age of 80?"; and
  (c) "How do I repair the door lock on a 2002 Chevrolet Silverado after it has been in a side-ways crash?"

(2) Gather finely refined military, counter-terrorism or competitive intelligence from text sources. Examples of such sources include Internet/Intranet/Extranet news, articles, blogs, journals, dictionaries, encyclopedias, e-mails, Word-formatted documents, PDF-formatted documents, Excel-formatted documents, and other documents. Exemplary questions like "Who from the U.S. banned group ABC was in London when person-of-interest XYZ was there in 2009?" may be answered automatically. This has dramatic implications for fighting terrorism, human rights violations, corruption, etc.;

(3) Make distance learning easier by allowing students to find precise answers, help and guideline with natural language interaction with computer based training, help material and courses;

(4) Make computer games more interesting by allowing the user to ask questions and provide responses in free form spoken or written text rather than choose from pre-selected options on a screen. For example, a war-game user may say "If my opponent has more than two ships left, then activate my missile batteries". Commercially available speech-to-text software may convert the spoken command to text, which may then be further processed by the disclosed embodiments;

(5) Control complex machinery, processing systems, computer systems, medical devices, virtual assistants and robots with voice commands spoken or typed in plain English or any other natural language. Due to efficiency of processing, the features of the disclosed embodiments may be applied in near real-time, real-time, and/or background/batch modes. The results of the processing may be used in other systems or methods, such as:
  (a) Fed to other computer systems for further processing;
  (b) Shown to human users on computer screens, game-consoles, hand-held devices, and special purpose gadgets for usage, review and response; and/or
  (c) Converted to voice/taste/scent/touch to provide the information for usage, review and response to normal or physically handicapped people or animals.

This feature may have significant implications for how computers are used today. Examples of practical applications of the disclosed embodiments include
  (i) A mother can call her home on her cell phone and say if the children have come home and finished the roast, increase the refrigerator temperature by one degree to save some electricity'. No human may be present at home to understand these directions. With the present invention, these instructions can be converted into precise "structured" instructions to other electronic control systems to carry out the desired actions.
  (ii) A soldier can say in a voice radio transmission, "Need urgent medical attention for two injured men, one bullet through thigh, another shrapnel in chest; located 100 meters north of bridge spanning the river in northwest direction". No human may be present at the support base to understand these directions. Using one or more of the disclosed embodiments, these instructions may be converted into precise "structured" instructions to other electronic command and control systems to carry out the desired actions.

(6) Converting free-form, unstructured information into precise structured data so that it may be processed by conventional data processing systems. Commonly found examples are:
  (a) Automatically read incoming e-mails and instant messages to answer precise customer questions or respond to requests for information;
  (b) Pulling specific repair instructions and/or data values out of sentences written in device and/or procedure manuals and providing those specific instructions to a human user (such as a repair technician) or to another computer; and (c) Pulling specific treatment instructions and values out of medical transcripts and providing them to nurses, doctors or other computer systems.

For example, a pathology report may include the following:

Final Diagnosis

A. RIGHT MENTAL NERVE, BIOPSY:—NERVE, NEGATIVE FOR MALIGNANCY.

B. RIGHT BUCCAL, GUM, AND MANDIBLE, COMPOSITE RESECTION: INVASIVE, MODERATELY TO POORLY DIFFERENTIATED SQUAMOUS CELL CARCINOMA. Site(s) of involvement: Right buccal Histologic grade: Moderately to poorly differentiated. Pattern of invasion: Pushing and infiltrative. Extent of invasion: Invading into underlying skeletal muscle for distance of 0.4 cm. Tumor does not invade into underlying bone. Margins: All mucosal margins and bone margins are negative for malignancy. Focal area of dysplasia is present. Angiolymphatic invasion: Not identified Perineural invasion: Present C. RIGHT SELECTIVE NECK, LYMPH NODE DISSECTION:—LEVEL 1A: METASTATIC CARCINOMA INVOLVING ONE OF EIGHT LYMPH NODES (1/8), SEE NOTE.—LEVEL 2: SIXTEEN LYMPH NODES, NEGATIVE FOR MALIGNANCY (0/16).—LEVEL 3: SIX LYMPH NODES, NEGATIVE FOR MALIGNANCY (0/6).—LEVEL 4: SEVEN LYMPH NODES, NEGATIVE FOR MALIGNANCY (0/7). NOTE: The lymph node measures 2.5 cm. No extracapsular tumor extension is identified. WLU Electronically Signed Out By W. L. M.D., PhD./WLI By the signature on this report, the individual or group listed as making the Final Interpretation/Diagnosis certifies that they have reviewed this case. Intraoperative Consultation: A. Microscopic diagnosis: Negative for malignancy. Dr. W. L., MD. B. Microscopic: Circumferential margins negative for malignancy.—Dr. W. L., MD.

The features of the disclosed embodiments may be used to correctly answer questions such as: (1) What body part was used for the biopsy? (2) What was the histology?; (3) How many tumors were reported?; (4) Where were the tumors located?; (5) What were the sizes of the tumors?; (6) Which other body parts did the tumors affect?; (7) How?; (8) Any other question whose answer may be found in the example text. If an answer cannot be found, the disclosed embodiments may be used to correctly reply "Unknown— no reference found to this data"; and (9) Further map the answers to formal codes like SNOMED or ICD-9/10, etc.

Other examples of converting free-form, unstructured information into precise structured data include:

(d) Matching resumes of candidates to specific job position requirements;

(e) Matching patient candidates to clinical trials by comparing structured data from a EMR (Electronic Medical Record) system with clinical trial participation criteria expressed in a natural language (e.g., "A female subject is eligible to participate if she is of non-childbearing potential, and if she is of childbearing potential she must use protocol defined contraception methods."); and (f) Any other usage today requiring manual review, interpretation, and/or input of the relevant part of free form text into a computer system, program or interface.

(7) Detecting anomalies in meaning of information:

(a) Finding and alerting on information that does not seem to "fit" or "belong";

(b) Blog spam detection; and (c) E-mail spam detection.

(8) Sentiment tracking of opinions expressed about precise topics in electronic written text (e.g., documents, reports, blogs, articles, essays) available from a local repository as well as the Internet. For example, "what percent of population would agree to a tax increase of 2% to increase junior school education spending by 1% for families defined as poor by government criteria in 2010?" This goes far beyond the precision of "sentiment tracking" based on "trigger phrase" matching available today.

(9) Leverage knowledge present in mass amounts of written text, which today is impossible to go through manually. For example, according to the "Armed Forces Communications and Electronics Association" in the United States, "The intelligence community produces 50,000 reports annually; a majority of them go unread".

(10) Generate indexes for videos based on precise description of events in the video, using video voice transcription (i.e., text version of sound). For example, a consumer may speak to the TV "Take me to the scene in this movie where Anna meets Mary a few days after John has left the country for his second meeting with Tom to discuss his promotion".

(11) Easily model complex scenarios/simulations for analysis, simply by describing them in natural language.

(12) Enable a new way of hiding secret information "in plain sight", among large natural text content. This may be performed by introducing words leading to the secret information among different sentences and providing appropriate questions to another party whose answers will identify the secret words in the large text. For example, the secret message "Turn on the light if you can meet at six" may be hidden in the following example text:

(a) More and more women want to turn to crafts as a source of additional income. They do this on the premise that crafts can be created easily at home and sold at a profit. Mary had tried to make a light out of used boxes but did not know how to sell it. It will help her if she can in the future be certain about being able to sell her art. May be you can help her. It will be best if you can meet with her within the next six days, before the holidays start. It is probably easier for her to meet at your office".

In the foregoing example, the first words to the answers to the following questions (as an example) reveal each word of the secret message:

(a) What can women do to make a better living?—Turn to crafts (yields first word "turn");

(b) Why do they want to do that?—on the premise that crafts can be created easily (yields first word "on");

(c) What did Mary try to make but did not make any money from?—light out of used boxes (yields first word "light");

(d) What will help her?—if she can be certain of making money (yields first word "if");

(e) Who should meet with Mary?—You (yields first word "you");

(f) What will make an ideal next step for you to help Mary?—can meet Mary (yields first word "can");

(g) What type of interaction is being suggested?—meet (yields first word "meet");

(h) Where is the interaction being suggested?—at the office (yields first word "at"); and (i) In how many days is the meeting being suggested?—Six (yields first word "six").

In the foregoing example, stringing together all first words re-generates the secret phrase "Turn on the light if you can meet at six". Note that the eight features of natural language processing mentioned earlier are leveraged to correctly generate the answers and reveal the secret phrase; meaning that a conventional computer, no matter how powerful, is useless in detecting the secret phrase. Conventional cryptology techniques (e.g., encryption of text and questions) may be used additionally, if desired. Other variations of bringing words from answers together to re-generate the secret phrase can be applied, e.g., using the last/middle/N'th word of the answer, etc.

III. Exemplary Embodiments

Many dictionaries and lexical databases provide word definitions and their relationships with other words; i.e. synonyms (e.g., the adjective "big" has synonym "large"), antonyms (e.g., the adjective "big" has antonym "little"), inherited hypernym (e.g., the noun "car" belongs to a noun class "motor vehicles") and many other relationships. For example, please see Table 1—Glossary of common lexical terms, as shown below, for a list of common relationships provided by a typical lexical database or thesaurus/dictionary.

TABLE 1

Glossary of common lexical terms adjective cluster
A group of adjective synsets that are organized around antonymous pairs or triplets. An adjective cluster contains two or more head synsets which represent antonymous concepts. Each head synset has one or more satellite synsets.
attribute
A noun for which adjectives express values. The noun weight is an attribute, for which the adjectives light and heavy express values.
base form
The base form of a word or collocation is the form to which inflections are added.
basic synset
Syntactically, same as synset.
collocation
A collocation is a string of two or more words, connected by spaces or hyphens. Examples are: man-eating shark, blue-collar, depend on, line of products.
concept
A high-level synset that is unique in its conceptual meaning and cannot be combined with any other synset.
coordinate
Coordinate terms are nouns or verbs that have the same hypernym.
cross-cluster pointer
A semantic pointer from one adjective cluster to another.
derivationally related forms
Terms in different syntactic categories that have the same root form and are semantically related.
direct antonyms
A pair of words between which there is an associative bond resulting from their frequent cooccurrence. In adjective clusters, direct antonyms appears only in head synsets.
domain
A topical classification to which a synset has been linked with a usage pointer.
domain term
A synset belonging to a topical class.
entailment
A verb X entails Y if X cannot be done unless Y is, or has been, done.
exception list
Morphological transformations for words that are not regular and therefore cannot be processed in an algorithmic manner.
group
Verb senses that similar in meaning and have been manually grouped together.
gloss
Each synset contains gloss consisting of a definition and optionally example sentences.
head synset TABLE 1-continued Glossary of common lexical terms Synset in an adjective cluster containing at least one word that has a direct antonym.
holonym
The name of the whole of which the meronym names a part. Y is a holonym of X if X is a part of Y.
hypernym
The generic term used to designate a whole class of specific instances. Y is a hypernym of X if X is a (kind of) Y.
hyponym
The specific term used to designate a member of a class. X is a hyponym of Y if X is a (kind of) Y.
indirect antonym
An adjective in a satellite synset that does not have a direct antonym has an indirect antonyms via the direct antonym of the head synset.
instance
A proper noun that refers to a particular, unique referent (as distinguished from nouns that refer to classes). This is a specific form of hyponym.
lemma
The base form for a word or collocation.
lexical pointer
A lexical pointer indicates a relation between words in synsets (word forms).
lexical type
A lexical type defines the basic nature of a word sense.
monosemous
Having only one sense in a syntactic category.
meronym
The name of a constituent part of, the substance of, or a member of something. X is a meronym of Y if X is a part of Y.
part of speech
Defined as either a noun, verb, adjective, or adverb. Same as syntactic category.
participial adjective
An adjective that is derived from a verb.
pertainym
A relational adjective. Adjectives that are pertainyms are usually defined by such phrases as "of or pertaining to" and do not have antonyms. A pertainym can point to a noun or another pertainym.
polysemous
Having more than one sense in a syntactic category.
polysemy count
Number of senses of a word in a syntactic category.
postnominal
A postnominal adjective occurs only immediately following the noun that it modifies.
predicative
An adjective that can be used only in predicate positions. If X is a predicate adjective, it can only be used in such phrases as "it is X" and never prenominally.
prenominal
An adjective that can occur only before the noun that it modifies: it cannot be used predicatively.
satellite synset
Synset in an adjective cluster representing a concept that is similar in meaning to the concept represented by its head synset.
semantic pointer
A semantic pointer indicates a relation between synsets (concepts).
sense
A meaning of a word. Each sense of a word is in a different synset.
subordinate
Same as hyponym.
superordinate
Same as hypernym.
synset
A synonym set; a set of words that are interchangeable in some context without changing the truth value of the preposition in which they are embedded.
troponym
A verb expressing a specific manner elaboration of another verb. X is a troponym of Y if to X is to Y in some manner.
unique beginner
A noun synset with no superordinate.

The disclosed embodiments use "scales". Scales may be frames of references for a particular property or attribute that may belong to any object (noun) and is affected by prepositions, adjectives, adverbs and actions (verbs).

One example of a scale in this context is "size". For semantic comprehension purposes, one may define that every size that is "small" in the context of the subject matter of the input text is associated by the negative end of the scale and "big" is associated with the positive end of the scale. Thus, there may be a frame of reference for "size", using which the disclosed embodiments may attach numeric values to the size of any object it encounters in input text or an input question.

The disclosed embodiments use scale values stretching from "−10" to "+10." However, these values may be any frame of reference that can depict the notions of relative values, e.g., more/higher (positive) and less/lower (negative) values. In one example, a particular scale may be "−1000" to "+1000" (or any other numerical range).

As an example, the words "big car" may represented in a measurable form, such as "Car [Size(+3)]". A "small car" may be represented as "Car[Size(−3)]". A "very big car" may be represented as "Car[Size(+5)]". A "very small car" may be represented as "Car[size(−5)]".

Values in the middle of the scale, with value zero, i.e., "[Size(0)]" may signify "Average, unknown, undefined or irrelevant size".

Figure 2:
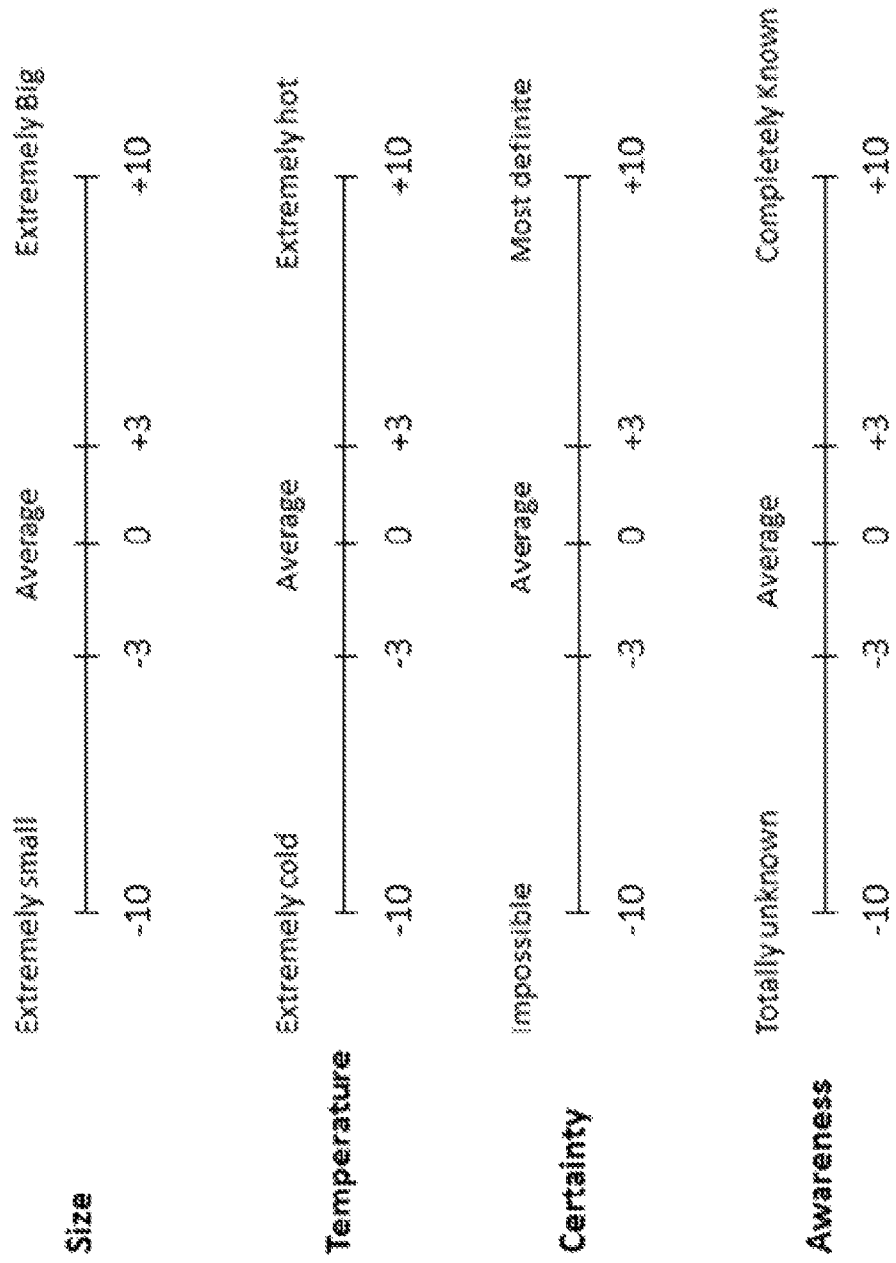
FIG. 2 illustrates examples of scales for natural language processing according to various aspects of the present invention.
Figure 3:
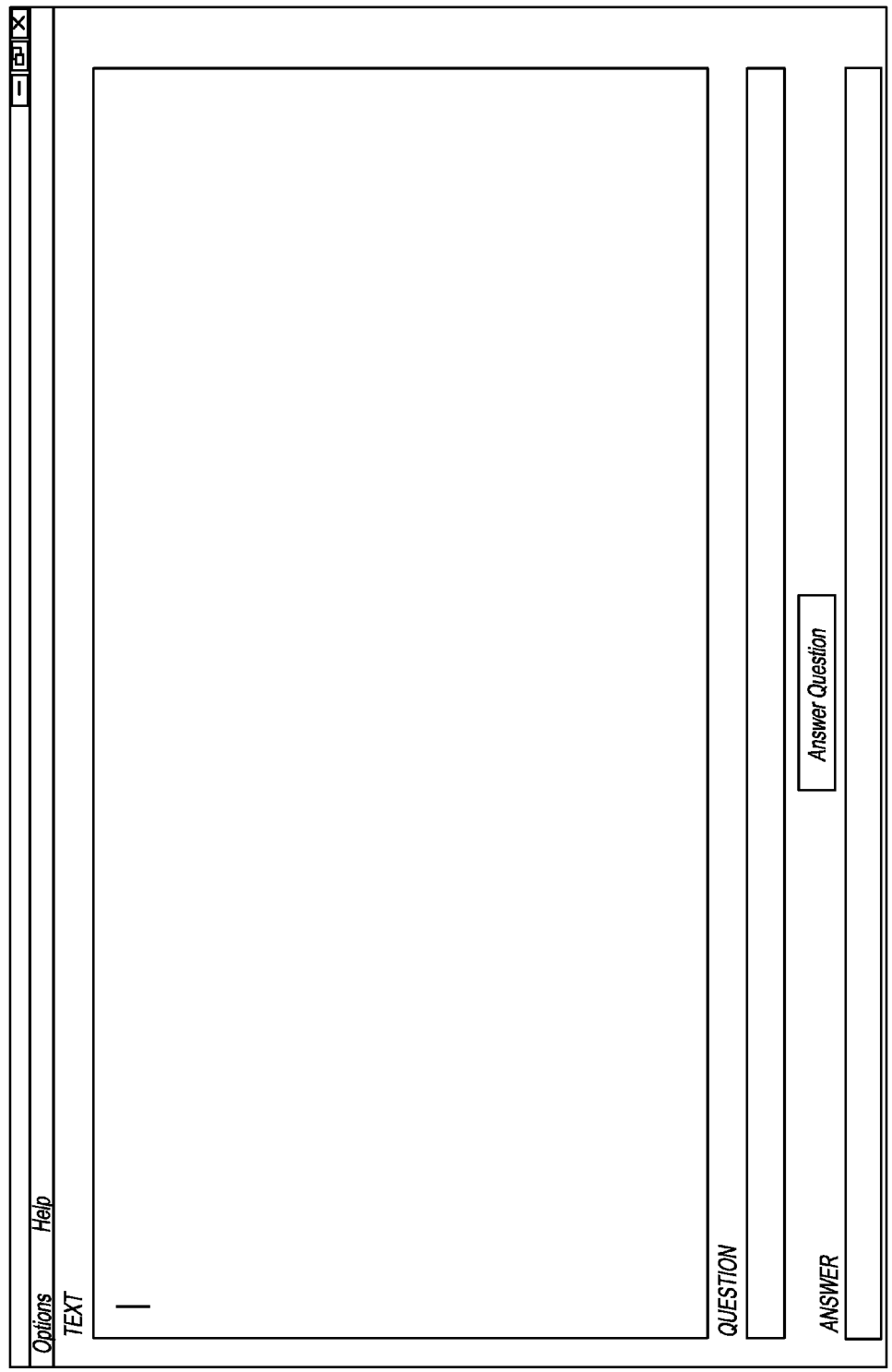
FIG. 3 illustrates a screen capture of a screen for entering free form into a text box of a computer program implementing various aspects of the present invention.

As an additional example, a "problem" is represented as "[Goodness(−3)]" while a "catastrophe", is represented as "[Goodness(−6)]", i.e., has much less Goodness, implying "far worse" than a regular problem. FIG. 2 further illustrates various examples of scales.

Anything that can fluctuate can be depicted as an appropriately named scale. Examples of other scales are "Speed (i.e., slow-fast)", "Stability (i.e., stationary-moving)", "Strength (i.e., weak-strong)", "Temperature (cold-hot)", "Ease (i.e., easy-difficult)", "Affinity (i.e., liked-hated)" etc. As described in more detail later, a scale may be either pre-defined or is defined on-the-fly while deriving answers. Table 2, as shown below, provides additional examples of various scales.

TABLE 2

Exemplary list of Scales

Duration, Speed, Goodness/Happiness, Strength/Support, Value (Worth), Range (of influence), Quality/Skill/Grace/intelligence/authority, Quantity/Count, Existence/Instantiation/Become, Activation (Happen)/Change, Size, Distance (between two things), Temperature, Age (since start-birth) New-Old, Timeline (Past, Present, Future), Relative_Timeline (Earlier than, Later than), Understandability (Why, how), Simplicity/Clarity, Stability/Fixedness, Wetness, Length, Breadth, Height/Intensity, Certainty/likelihood/possibility/Reliability, Dueness, Emphasis/Remarkability/Noticeability, Creation_Control_On_Others, Creation_Controlled_By_Others, Behavior_Control_On_Others, Behavior_Controlled_By_Others, Possession/Belonging, Ease, Need/Want/Lack_of_sufficiency-or-availability, Affinity/liking/Desire, Association, Dextrality/Right-handedness As an example, "near" is represented as "[Distance(−3)]". "Far is represented as "[Distance(+3)]".

Scales also represent not in a measurable manner, simply by attaching the Prefix "NOT_" to the scale. For example, the phrase not very hot" may be represented by "NOT_Temperature(+5)".

Actions (Verbs) may have their own scales and scale values. As an example, the verb to hear may have a scale of "[Temperature(+3)]", while the verb "to cool" may have a scale of "[Temperature(−3)]". When a verb is used in a sentence, it may link those effects to the object noun in the sentence.

The present invention may use the symbol "<−>" to mean "linked to" in the discussion below for brevity. For example, an effect of the sentence "I heated the food" on the noun "food" may be represented as "I<−>heat [temperature(+3)] <−>food". Effects of the sentence "I cooled the food" on the noun "food" may be represented as "I<−>cooled [temperature(−3)]<−>food".

Scales may form the "framework" or baseline that normalizes the semantic meaning of different words acting in that scale. Thus, the semantic meaning of the two very different sentences such as "I warmed the food" and "The food tasted delicious because it was hot" may both result in the same ending result of "food" being linked to "[temperature(+3)]", allowing correct answering of the question "Was the food of high temperature? (i.e., without using any form of "heat/hot" in the question)" as "YES" in both cases. This is the feature of "semantic (i.e., meaning) comprehension" in the various embodiments disclosed herein.

As shown in Table 1, "concept" may be a high-level synset that is unique in its conceptual meaning and cannot be combined with any other synset. The reader is invited to reference Table 3, as shown below, for a list of exemplary concepts. Each concept in turn may enumerate nouns, verbs, adjectives, adverbs and idioms that convey that particular meaning.

TABLE 3

List of exemplary concepts defined in most lexical databases

Abode, Abrogation, Absence, Absence of Choice, Absence of Influence, Absence of Motive,
Absurdity, Accompaniment, Accounts, Accusation, Achromatism, Acquisition, Acquittal, Action,
Activity, Addition, Adjunct, Adolescence, Adversity, Advice, Affectation, Affections, Affirmation, Age,
Agency, Agent, Aggravation, Agitation, Agreement, Agriculture, Aid, Air, Airpipe, Alarm, Allocution,
Ambush, Amorphism, Amusement, Anachronism, Angel, Angularity, Animal, Animality, Answer,
Aphony, Appearance, Apportionment, Approach, Approbation, Arena, Arms, Arrangement, Arrival,
Artist, Artlessness, Ascent, Asceticism, Assemblage, Assent, Atonement, Attack, Attention, Attraction,
Attribution, Authority, Auxiliary, Avoidance, Bad Man, Badness, Bane, Barter, Base, Beauty,
Beginning, Belief, Benefactor, Benevolence, Bisection, Blackness, Blemish, Blindness, Blueness,
Bluntness, Blusterer, Boasting, Book, Booty, Borrowing, Botany, Breadth, Thickness, Brittleness,
Brown, Bubble, Bungler, Business, Calefaction, Canonicals, Caprice, Care, Carrier, Cause, Caution,
Celebration, Celibacy, Centrality, Certainty, Cessation, Chance, Change, Changeableness,
Cheapness, Cheerfulness, Choice, Chronometry, Churchdom, Circuit, Circuition, Circularity,
Circumjacence, Circumscription, Circumstance, Class, Cleanness, Clergy, Closure, Coherence, Cold,
Color, Combatant, Combination, Command, Commission, Commonalty, Compact, Comparison,
Compendium, Compensation, Completeness, Completion, Complexity, Component, Composition,
Compromise, Compulsion, Concavity, Concealment, Conciseness, Concord, Concurrence,
Condemnation, Condiment, Conditions, Condolence, Conduct, Conduit, Conformity, Confutation,
Congratulation, Consanguinity, Consent, Consignee, Contempt, Content, Contention, Contents,
Contiguity, Contingent, Continuance in action, Continuity, Contraction, Contraposition, Contrariety,
Convergence, Conversion, Convexity, Convolution, Cooperation, Copy, Corpse, Correlation,
Correspondence, Council, Counter Evidence, Counteraction, Courage, Course, Courtesy, Covering,
Cowardice, Credit, Credulity, Crossing, Cry, Cunning, Curiosity, Curvature, Danger, Darkness,
Deafness, Dearness, Death, Debt, Deceiver, Deception, Decomposition, Decrement, Defense,
Defiance, Degree, Deity, Dejection, Deliverance, Demon, Demonstration, Density, Departure,
Deprecation, Depression, Depth, Deputy, Derangement, Dereliction of Duty, Descent, Description,
Desire, Destiny, Destroyer, Destruction, Desuetude, Deterioration, Detraction, Detractor, Deviation,
Dextrality, Difference, Different time, Difficulty, Diffuseness, Dimness, Dimsightedness, Direction,
Director, Disagreement, Disappearance, Disappointment, Disapprobation, Disclosure, Discontent,
Discontinuity, Discord, Discount, Discourtesy, Discovery, Discrimination, Disease, Disinterestedness,
Disjunction, Dislike, Disobedience, Disorder, Displacement, Disrepute, Disrespect, Dissent,
Dissertation, Dissimilarity, Dissuasion, Distance, Distortion, Disuse, Diuturnity, Divergence,
Divestment, Divorce, Drama, Drunkenness, Dryness, Duality, Dueness, Dullness, Dupe, Duplication,
Duty, Earliness, Economy, Edge, Effect, Egress, Ejection, Elasticity, Elegance, Elevation, End,
Endearment, Enemy, Engraving, Enmity, Envy, Equality, Equivocalness, Error, Escape, Essay,
Evening, Eventuality, Evidence, Evil, Evil doer, Evolution, Exaggeration, Excitability, Excitation,
Exclusion, Excretion, Exemption, Exertion, Existence, Expansion, Expectance, Expectation,
Expedience, Expenditure, Experiment, Exteriority, Extraction, Extraneousness, Extrinsicality, Facility,
Failure, Faintness, Falsehood, Fashion, Fastidiousness, Fasting, Fatigue, Favorite, Fear, Feebleness,
Feeling, Fetor, Fewness, Filament, Five and Other Numbers, Flatness, Flatterer, Flattery, Fluidity,
Focus, Fold, Food, Fool, Fop, Foresight, Forgiveness, Form, Fraction, Fragrance, Freedom,
Frequency, Friction, Friend, Friendship, Front, Fuel, Furnace, Furrow, Futurity, Gaseity, Generality,
Giving, Gluttony, Good, Good Man, Goodness, Grammar, Gratitude, Gravity, Gray, Greatness,
Greenness, Guilt, Gulf, Habit, Hardness, Haste, Hate, Health, Hearing, Heat, Heaven, Height, Hell,
Heterodoxy, Hindrance, Hope, Hopelessness, Horizontality, Humility, Humorist, Husbandry, Idea,
Identity, Idolatry, Ignoramus, Ignorance, Illegality, Imagination, Imbecility, Imitation, Immateriality,
Impenitence, Imperfection, Impiety, Importance, Impossibility, Impotence, Improbability, Improbity,
Improvement, Impulse, Impurity, Inaction, Inactivity, Inattention, Inclosure, Inclusion, Incogitancy,
Incoherence, Incompleteness, Increase, Incredulity, Incuriosity, Indication, Indifference,
Indiscrimination, Inelasticity, Inelegance, Inequality, Inexcitability, Inexistence, Inexpectation,
Inexpedience, Inextension, Infant, Inferiority, Infinity, Influence, Information, Infrequency, Ingratitude,
Ingress, Inhabitant, Innocence, Inodorousness, Inorganization, Inquiry, Insalubrity, Insanity,
Insensibility, Insertion, Insipidity, Insolence, Instantaneity, Instrument, Instrumentality, Insufficiency,
Intellect, Intelligence, Intelligibility, Intemperance, Intention, Interchange, Interiority, Interjacence,
Interlocution, Interment, Interpretation, Interpreter, Interval, Intrinsicality, Intuition Sophistry, Inutility,
Inversion, Investment, Invisibility, Irascibility, Irregularity of recurrence, Irrelation, Irreligion,
Irresolution, Island, Jealousy, Journey, Judge, Judgment, Junction, Jurisdiction, Keeper, Killing,
Knave, Knowledge, Laity, Lamentation, Land, Language, Latency, Lateness, Laterality,
Laughingstock, Lawsuit, Lawyer, Laxity, Layer, Leap, Learner, Learning, Legality, Leisure, Lending,
Length, Lenity, Letter, Levity, Liability, Liberality, Liberation, Libertine, Life, Light, Limit, Lining,
Liquefaction, List, Littleness, Location, Loquacity, Loss, Loudness, Love, Lowness, Lubrication,
Luminary, Madman, Malediction, Malevolence, Man, Manifestation, Mankind, Mariner, Marriage,
Marsh, Mart, Master, Materiality, Materials, Maxim, Mean, Meaning, Means, Measurement, Mediation,
Mediocrity, Melody, Memory, Merchandise, Merchant, Messenger, Metaphor, Method, Mid-course,
Middle, Misanthropy, Misinterpretation, Misjudgment, Misnomer, Misrepresentation, Misteaching,
Misuse, Mixture, Moderation, Modesty, Moisture, Money, Morning, Motion, Motive, Multiformity,
Multitude, Music, Musical Instruments, Musician, Mythological and other fabulous Deities and Powers,
Narrowness, Navigation, Nearness, Necessity, Negation, Neglect, Neologism, Neverness, Newness,
News, Nobility, Nomenclature, Nonaddition, Nonassemblage, Noncompletion, Nonimitation,
Nonincrease, Decrease, Nonobservance, Nonpayment, Nonpreparation, Nonresonance,
Nonuniformity, Normality, Notch, Number, Numbness, Numeration, Obedience, Obliquity,
Obliteration, Oblivion, Obscurity, Observance, Obstinacy, Occasion, Ocean, Odor, Offer, Oil,
Oldness, Omen, Opacity, Opening, Opponent, Opposition, Optical Instruments, Oracle, Orange,
Order, Organization, Ornament, Orthodoxy, Oscillation, Ostentation, Outline, Overestimation,
Pacification, Pain, Painfulness, Painting, Parallelism, Parsimony, Part, Participation, Party, Passage,
Paternity, Payment, Peace, Penalty, Pendency, Penitence, Perfection, Perforator, Period,
Permanence, Permission, Perpetuity, Perseverance, Perspicuity, Petitioner, Philanthropy, Phrase,
Physical Energy, Physical Inertness, Physical Insensibility, Physical Pain, Physical Pleasure, Physical TABLE 3-continued List of exemplary concepts defined in most lexical databases Sensibility, Piety, Pitfall, Pitilessness, Pity, Place, Plain, Plainness, Plan, Pleasurableness, Pleasure,
Plunge, Plurality, Poetry, Possession, Possessor, Possibility, Posteriority, Posterity, Poverty, Power,
Precedence, Precept, Precession, Precursor, Predetermination, Prediction, Preparation, Presence,
Present Time, Preservation, Preterition, Pretext, Price, Pride, Printing, Priority, Prison, Prisoner,
Probability, Probity, Prodigality, Prodigy, Producer, Production, Productiveness, Proficient,
Progression, Prohibition, Promise, Property, Propulsion, Prose, Prosperity, Prototype, Provision,
Pseudo-Revelation, Publication, Pulpiness, Pulverulence, Punctuality, Pungency, Punishment,
Purchase, Purity, Purple, Pursuit, Quadrisection, Quadruplication, Qualification, Quantity, Quaternity,
Quiescence, Quinquesection, Rarity, Rashness, Rear, Reasoning, Receipt, Receiving, Receptacle,
Reception, Recession, Recoil, Record, Recorder, Redness, Redundance, Refreshment,
Refrigeration, Refrigeratory, Refuge, Refusal, Region, Regression, Regret, Regularity of recurrence
Periodicity, Rejection, Rejoicing, Relapse, Relation, Release from engagement, Relief,
Relinquishment, Remainder, Remedy, Repetition, Repose, Representation, Reproduction, Repulsion,
Repute, Request, Requirement, Resentment, Resignation, Resin, Resistance, Resolution,
Resonance, Respect, Restitution, Restoration, Restraint, Retaliation, Retention, Revelation, Revenge,
Reversion, Revolution, Reward, Ridicule, Ridiculousness, Right, Rite, River, Roll, Rotation, Rotundity,
Roughness, Safety, Sage, Sale, Salubrity, Sanity, Satan, Satiety, Savoriness, Scepter, Scholar,
School, Scourge, Sculpture, Seclusion, Secret, Security, Selfishness, Semiliquidity,
Semitransparency, Sensations of Touch, Sensibility, Sensualist, Sequel, Sequence, Servant, Servility,
Severity, Shade, Shallowness, Sharpness, Ship, Shortcoming, Shortness, Sibilation, Silence,
Similarity, Simpleness, Simplicity, Sinistrality, Situation, Size, Skill, Slowness, Smallness,
Smoothness, Snap, Sobriety, Sociality, Softness, Solecism, Soliloquy, Sorcerer, Sorcery, Sound,
Sourness, Space, Speciality, Spectator, Speech, Spell, Stability, Stammering, State, Stealing,
Stopper, Store, Straightness, Stream, Strength, Stridor, Style, Subjection, Submission, Substantiality,
Substitute, Substitution, Success, Sufficiency, Sullenness, Summit, Superiority, Support, Supposition,
Sweetness, Symmetry, Synchronism, Taciturnity, Taking, Taste, Teacher, Teaching, Temperance,
Temple, Tenacity, Tendency, Tergiversation, Term, Texture, Theology, Thermometer, Thief, Thought,
Threat, Time, Title, Topic, Touch, Traction, Transcursion, Transfer, Transference, Transientness,
Transparency, Traveler, Treasurer, Treasury, Triality, Tribunal, Triplication, Trisection, Trophy, Truth,
Ugliness, Ululation, Unbelief, Uncertainty, Uncleanness, Unconformity, Unctuousness,
Underestimation, Undertaking, Undueness, Uniformity, Unimportance, Unintelligibility, Unity,
Unmeaningness, Unproductiveness, Unsavoriness, Unskillfulness, Unsubstantiality, Untimeliness,
Untruth, Unwillingness, Use, Utility, Vanity, Vaporization, Variation, Variegation, Vegetability,
Vegetable, Vehicle, Velocity, Veracity, Verticality, Veteran, Vice, Vigor, Vinculum, Vindication,
Violence, Virtue, Visibility, Vision, Voice, Vulgarity, Warfare, Warning, Waste, Water, Weakness,
Wealth, Weariness, Whiteness, Whole, Will, Willingness, Wind, Wit, Woman, Wonder, Word,
Workshop, World, Worship, Writing, Wrong, Yellowness, Youth, Zero, Zoology The disclosed embodiments may use a Word-concept-scale database (kept in a commonly used data storage medium like a relational database or a file) to keep lexical details like synonyms, antonyms, hypernyms, hyponyms, troponyms, derivationally related forms, etc. for a "base" set of about 200,000 "most common" words (nouns, verbs, adjectives, adverbs, prepositions, idioms) that form the basis of elemental language structure and are freely available from lexical databases like WORDNET or common thesauri and dictionaries on the Internet. Additionally, the disclosed embodiments may pre-create and save the concepts and scales for each of these words. The concept values for each word may be decided by taking the "most-common-intersection" concepts from the list of concepts implied by each sense of each word, its synonyms and its hypernyms. For example, the adjective "muscular" in one of its senses (meanings) has a synonym "powerful". These two words appear together in the concept called "Strength", allowing us to determine that "Strength" is the correct concept for this meaning of the word "muscular". For example, please see Table 4—Example of words implying a particular concept ("Strength"), as set forth below, for words that imply concept "Strength" as an example. The lexical databases and common thesauri provide a similar list of words for every concept.

TABLE 4

Example of words implying a particular concept ("Strength")

[Nouns] strength; power; energy; vigor, force; main force, physical force, brute force; spring, elasticity, tone, tension, tonicity.
stoutness; lustihood, stamina, nerve, muscle, sinew, thews and sinews, physique; pith, pithiness; virility, vitality, athletics, athleticism; gymnastics, feats of strength, adamant, steel, iron, oak, heart of oak; iron grip; grit, bone, athlete, gymnast, acrobat; superman, Atlas, Hercules, Antaeus, Samson, Cyclops, Goliath; tower of strength; giant refreshed, strengthening; invigoration, refreshment, refocillation, dynamics
[Verbs] be strong, be stronger; overmatch, render strong; give strength; strengthen, invigorate, brace, nerve, fortify, sustain, harden, case harden, steel, gird; screw up, wind up, set up; gird up one's loins, brace up one's loins; recruit, set on one's legs; vivify; refresh, refect; reinforce, restore
[Adjectives] strong, mighty, vigorous, forcible, hard, adamantine, stout, robust, sturdy, hardy, powerful, potent, puissant, valid. resistless, irresistible, invincible, proof against, impregnable, unconquerable, indomitable, dominating, inextinguishable, unquenchable; incontestable; more than a match for; overpowering, overwhelming; all powerful, all sufficient; sovereign.
able-bodied; athletic; Herculean, Cyclopean, Atlantean; muscular, brawny, wiry, well-knit, broad-shouldered, sinewy, strapping, stalwart, gigantic, manly, man-like, manful; masculine, male, virile, unweakened, unallayed, unwithered, unshaken, unworn, unexhausted; in full force, in full swing; in the TABLE 4-continued Example of words implying a particular concept ("Strength")

plenitude of power, stubborn, thick-ribbed, made of iron, deep-rooted; strong as a lion, strong as a horse, strong as brandy; sound as a roach; in fine feather, in high feather; like a giant refreshed.
[Adverbs] strongly; by force; by main force, by compulsion
[Phrases] "our withers are unwrung", Blut und Eisen ["Blood and iron" (German)]; coelitus mihi vires; du fort au diable; en habiles gens ["As skillful people" (French)]; ex vi termini ["With strength comes limits" (Latin)]; flecti non frangi ["To be bent is not to be broken" (Latin)]; "he that wrestles with us strengthens our nerves and sharpens our skill" [Burke]; "inflexible in faith, invincible in arms"

The disclosed embodiments further convert concepts into scales by applying mapping rules. For example, please see Table 5—Exemplary mapping of concepts to scales, as shown below, for an example of scales derived from concepts. For example, the concept "Strength" (as well as other concepts like "Superiority", "Agreement", "Power" etc. and additional concepts) is mapped to scale "Strength(+3)"; while concepts like "Disagreement", "Inferiority", "Impotence", "Weakness", "Unproductiveness", "Absence of Influence" are mapped to scale "Strength(−3)". While only some concepts are shown in Table 5 as examples, all concepts are mapped to scales. In effect, every sense of every word in the Word-concept-scale database may have one or more concepts and scales associated with it in the database.

TABLE 5

Exemplary mapping of concepts to scales

| Scale | Concepts Implying Plus_3 | Concepts Implying Minus_3 | Concepts Implying Plus_1 | Concepts Implying Plus_2 | Concepts Implying Minus_1 | Concepts Implying Minus_2 |
|---|---|---|---|---|---|---|
| Duration | Time., Course. [Indefinite duration.], Diuturnity. [Long duration.], Perpetuity. [Endless duration.], Conversion. [Gradual change to something different.], | Neverness., Transientness. [Short duration.], Instantaneity. [Point of time], Revolution. [Sudden or violent change.], | | | | |
| Goodness/ (Happiness) | | Violence., | stable | | | |
| Strength/ (Support) | Agreement., Superiority., Power., Strength. [Degree of power.], Productiveness, Physical Energy., Violence., Influence., Concurrence., | Disagreement., Inferiority., Impotence., Weakness., Unproductiveness., Absence of Influence., Counteraction. | Moderation., Physical Inertness., | — | — | — |
| Quantity/Count | Variation., Assemblage., Focus. [Place of meeting.], Multitude., Repetition., Infinity., Frequency., Production., Reproduction., Concurrence., Regularity of recurrence. Periodicity., Irregularity of recurrence., | Nonassemblage., Zero., Neverness., Infrequency., Destruction. [Nonproduction.], | Fewness., Duality., Duplication., Triality., Triplication., | Quaternity., Quadruplication., Five, | | |
| Existence/Instantiation/ Become | Existence., Substantiality., Intrinsicality., Extrinsicality., State., | Inexistence., Unsubstantiality., | | | | |
| Activation (Happen)/ Change | Continuance in action., Eventuality., | Cessation. [Change from action to rest.], | | | | |

TABLE 5-continued

Exemplary mapping of concepts to scales

| Scale | Concepts Implying Plus_3 | Concepts Implying Minus_3 | Concepts Implying Plus_1 | Concepts Implying Plus_2 | Concepts Implying Minus_1 | Concepts Implying Minus_2 |
|---|---|---|---|---|---|---|
| Size | Uniformity., Greatness., Increase., Addition., Adjunct. [Thing added], Mixture. [Forming a whole without coherence.], Composition., Inclusion., | Smallness., Nonincrease, Decrease., Nonaddition., Decrement. [Thing deducted.], Decomposition., Exclusion., Component., Fraction. [Less than one.], | Mean., | | Remainder. [Thing remaining.], Bisection. [Division into two parts.]. | Trisection. [Division into three parts.], Quadrisection. [Division into four parts.], Quinquesection, |
| Distance (between two things) | Disjunction., Decomposition., Exclusion., Nonassemblage., | Mixture. [Forming a whole without coherence.], Junction., Coherence., Incoherence. [Want of adhesion, nonadhesion, immiscibility.], Combination., Composition., Component., Assemblage., Focus. [Place of meeting.], Inclusion., Accompaniment., | Middle., | | | |

Some words may imply multiple concepts and scales at the same time. For example, the word "lightning" with inherited hypernym of "discharge" together appear in concepts "Velocity" and "Violence", resulting in scales of "Speed(+3)" and "Strength(+3)".

The notion of scales may also provide for "implied" comprehension, e.g., the sentence "Boston is hotter than Chicago" will result in a Scale-Web of "Boston [temperature (+3)]<−>is <−>Chicago [temperature(−3)]". This link, when viewed from the other end, also automatically represents the converse relationship, i.e., "Chicago [temperature(−3)<−>is <−>Boston [temperature(+3)]", implying that "Chicago is colder than Boston".

Missing Scale-Web links between two words may imply an "Average/unknown/irrelevant" value for that scale. For example, the Scale-Web links generated from the sentences "I made soup in the morning. I heated the soup in the evening." may imply that the soup was of average/unknown temperature just before the action of heating happened in the evening, because the [temperature(+3)] scale link was not present before the heating happened.

In one implementation, the disclosed embodiments may process an input text string at run-time to separate it into words (which, as mentioned earlier, may be phrases) and may decide the part-of-Speech (PoS), i.e., Noun, Verb, Adjective, Adverb, Preposition, Article, Conjunction, etc. for each word. The lemma (root word of current word) and the tense for verbs and plural/singular for nouns may be determined by interrogating the various forms of words kept in the database. Possible scales of each word in its possible Part-of-Speech categories (e.g., "train" might be used as a noun in the text or as a verb) from the database may then be compared with each other across all words in the sentences and other grammar rules may be utilized to decide the likely Part-of-Speech and also the correct sense (meaning) of that word in the input text. Abbreviations and acronyms are detected and expanded, when applicable, to detect their full equivalents. Then the links of each word to the other words may be decided (e.g., the subject and object of every verb are determined and linked; preposition links are determined and linked) following language syntax rules, e.g., for an active voice verb, the subject is the noun to the left of the verb while for a passive voice verb, the subject is the noun to the right of the verb. Words may link to other words that are not adjacent words.

Finally, a data model is created in the memory of the program linking the words in input text sentences and their scale links (from the pre-saved database) to each other. Multiple Scale links originating from different words may connect to the same word, essentially forming a network of words and their scale relationships for the properties represented by the scales. As used herein, a data model that includes a network of words along with their associated scales may be considered a "Text Scale-Web", with the link intersect points in the Web forming "nodes". For example, please see the top of Table 6—Example of Text-Scale-Web for an example of text sentences converted into the data model, which is an array consisting of rows and columns of data suitable for interrogation and manipulation in most typical programming languages using well-known programming techniques (e.g., using "select" methods of ADO.NET or LINQ in a Microsoft .NET programming environment).

TABLE 6

Example of Text-Scale-Web
Exemplary Text Sentences - "The car is big. Mary bought the car"

| Sentence Number | Serial Number From Text Sentence | Node Word | Node Part of Speech | Node Root Word | Scale | Scale Sign | Scale Value | Other Side Node Row Word |
|---|---|---|---|---|---|---|---|---|
| 1 | 2 | The car | Noun | car | car | + | 3 | is |
| 1 | 3 | is | Verb | be | Verb_Subject | + | 3 | The car |
| 1 | 3 | is | Verb | be | Existence | + | 3 | |
| 1 | 3 | is | Verb | be | Verb_Object | + | 3 | big |
| 1 | 4 | big | Adjective | big | Size | + | 3 | is |
| 2 | 6 | Mary | Noun | Mary | Mary | + | 3 | bought |
| 2 | 7 | bought | Verb | buy | Verb_Subject | + | 3 | Mary |
| 2 | 7 | bought | Verb | buy | Possession | + | 3 | |
| 2 | 7 | bought | Verb | buy | Verb_Object | + | 3 | the car |
| 2 | 9 | the car | Noun | car | car | + | 3 | bought |

| Sentence Number | Serial Number From Text Sentence | Node Word | Other Side Node Row Serial Number | Other Side Node Row Part Of Speech | Lexical Type | Synonyms and hypernym | Antonyms |
|---|---|---|---|---|---|---|---|
| 1 | 2 | The car | 3 | Verb | noun. artifact | Auto\| automobile\| motorcar \| motor Vehicle \| wheeled vehicle \| vehicle \| conveyance \| transport | |
| 1 | 3 | is | 2 | Noun | verb. stative | | |
| 1 | 3 | is | | | verb. stative | | |
| 1 | 3 | is | 4 | Adjective | verb. stative | | |
| 1 | 4 | big | 3 | Verb | adj. all | large | small \| little |
| 2 | 6 | Mary | 7 | Verb | noun. person | | |
| 2 | 7 | bought | 6 | Noun | verb. possession | Purchase \| get \| acquire | sell |
| 2 | 7 | bought | | | verb. possession | Purchase \| get \| acquire | sell |
| 2 | 7 | bought | 9 | Noun | verb. possession | Purchase \| get \| acquire | sell |
| 2 | 9 | the car | 7 | Verb | noun. artifact | Auto\| automobile\| motorcar \| motor Vehicle \| wheeled vehicle \| vehicle \| conveyance \| transport | |

List of Unique Objects Detected in Text

| Object | Object_Id | Sentence | Serial number from Text Sentence | |
|---|---|---|---|---|
| Car | TUO01 | 1 | 2 | |
| Mary | TUO02 | 2 | 6 | |
| Car | TUO01 | 2 | 9 | Same "car" from sentence 1. Allows retrieval of data regarding the car from multiple sentences, allowing for multi-sentence comprehension ("Discourse Intelligence"). |

While processing each word in each sentence of the text, rows inserted from earlier text sentences in the same array are checked to see if a prior reference was found for the same object (e.g., "red car bought by John in July based on advice of his friend Tom"—all of this might have been described in one or multiple earlier sentences) and a sub-array named "List of Unique Objects Detected in Text" is updated. For example, please see the bottom of Table 6—Example of Text-Scale-Web for an example of the "List of Unique Objects Detected in Text" sub-array. The disclosed embodiments may perform this by comparing the words from rows inserted in the same array from earlier sentences, along with the scales describing the properties of each word and links, using well-known programming techniques (e.g., using "select" methods of ADO.NET or LINQ in a Microsoft .NET programming environment) to search the rows and columns of the data mode array to see if a match is found between objects mentioned in the current sentence and the earlier sentences in the text (e.g., a "car" in the current sentence is matched by a "car" in the earlier sentences in the text) and their relationships between the objects as defined by the linking scales (e.g., is that car owned by John— indicated by scale "Possession(+3)").

Values in column "Other Side Node Row Serial Number" of the Text-Scale-Web array allow finding related words within earlier sentences. Values in the column "Serial number from Text Sentence" of the related sub-array "List of Unique Objects Detected in Text" allow finding other sentences referencing the same objects as in the current sentence being checked. The disclosed embodiments thus check for the values in the nodes and the scales between the nodes to evaluate semantic relationships described by the scales of verbs, adjectives, adverbs and prepositions across multiple sentences to detect same objects across multiple sentences.

Thus words in subsequent sentences may link to their earlier references in earlier sentences (e.g., pronouns like "it", "he," "they"; based on well-known rules using gender, plural/singular) or recognizable descriptions of nouns. For example, the example text "Mary bought a car. John rented a car. John's car is big. Mary's car is small. The big car is red." may have two unique instances of cars, even though every sentence has the word "car" in it. "John's car", "rented car", "big car" and "red car" may all refer to the same car across multiple sentences. Detecting these multi-sentence references to the same objects using their associated scales are the basis for the disclosed embodiment's feature of "Discourse Intelligence", i.e., multi-sentence comprehension. For example, please see the bottom of Table 6—Example of Text-Scale-Web for an example of an additional array used by the disclosed embodiments to store the knowledge of multi-sentence references to same objects.

One aspect of Scales allows for a measurable and comparable representation of any property, attribute, description or detail before and after any sentence. For example like:

(1) Change or comparison of tangible things like size, temperature;

(2) Change or comparison of intangible properties like fear, anger, uncertainty, complexity, similarity, absence/presence etc.;

(3) Negation (e.g., "high temperature" means "not cold", i.e. "Temperature(+3)" correctly mathematically matches "NOT_Temperature(−3)");

(4) Comparisons (e.g., "warm" is not "hot", i.e. "Warm [Temperature(+2)]" does not mathematically equal the requirement for "Hot[Temperature(+3)]"); and (5) Compound verbs like "tried to open", "thought of trying to prevent" etc.

(6) Tenses—using Scale "Timeline" as follows:
(a) Past—[Timeline(−5)] to [Timeline(−3)];
(b) Present—[Timeline(−1)] to [Timeline(+2)];
(c) Future—[Timeline(+3)] to [Timeline(+5)]; and (7) Comparatives (_er) and superlatives (_est).

(8) Sets/groups/collections of items and references to inexact (e.g., "some cars in the parking lot") and exact quantities (e.g., "three cars in the parking lot") within sets. Sets are described further below.

(9) Conjunctions (and/or/but/if/else/though);

(10) Effects of anaphora and prepositions; and

(11) Precise disambiguated meaning of a word/phrase in a specific sentence using "Scale Intersects" described in more details later.

Groups of items (e.g., "red cars in the parking lot near the station") are called "Sets". Inexact quantities within the set are represented by the following words and the associated scale values are linked between the "Set" noun node and the inexact quantity noun nodes as shown:

(1) All—[Completeness_of_Set(+3)];
(2) Most—[Completeness_of_Set (+2)];
(3) Many—[Completeness_of_Set (+1)];
(4) Fair number, Some—[Completeness_of_Set (0)];
(5) Several—[Completeness_of_Set (−1)];
(6) Few—[Completeness_of_Set (−2)];
(7) None—[Completeness_of_Set (−3)]; and
(8) Remaining/rest—[Residuum_of_Set(+3)].

Absolute quantities and "Units of Measure" may be represented as their own scales. For example, "300 dollars" is represented as "300[Quantity-Absolute(300)]<−>dollars [Unit-of-Measure_WORTH(+3)]". This allows for conversion of one "System of Units" into another. For example, temperature described in Celsius can be converted to Fahrenheit or vice versa. Ordinals are represented as the scale "Sequence_Position_Absolute". For example, "5$^{th}$ car" is represented as "5th [Sequence_Position_Absolute(5)]<−> Car".

Scale effects of prepositions are double sided, i.e., different scale effects are linked to different words to the left and right of the prepositions. For example, "the book is on the table" is represented by "Book <−>[height(+3) on [height (−3)]<−>Table". When viewed from right to left, the same Scale links denote "Table <−>[height(−3) on [height(+3)] <−>Book", correctly implying that "the table is below the book". This approach also ensures that "father of my neighbor" will not be confused with "neighbor of my father", since the scale links to words to the left of a preposition have different scales than the links to the words to the right of the preposition. The scale "[Association_Prior_Word(+3)]" is used to link the prior word with the preposition, if the preposition scales acting on the following and prior words are identical, e.g., the preposition "near" has the same scale "[Distance(−3)]" for both prior and following words, correctly implying that when item-A is near item-B, item-B is also near item-A. Some preposition scales provide time-sensitive information. For example, the preposition "from" implies "previously there" and "later not there", which is correctly supported by the scales for "from", i.e., "[Distance (−3), Distance(3)]". For example, please see Table 7—Example of preposition senses (meanings), as set forth below, and their effects on prior and following words.

TABLE 7

Example of preposition senses (meanings) and their effects on prior and following words

| Preposition | Provides additional description in dimension | Effect_On_Prior_Noun/Verb | Effect_On_First_Following_Noun/Verb |
| --- | --- | --- | --- |
| about | Association | Association_Prior_Word_(3) | Association(3) |
| about | How_much/Approximation | Certainty(2), Similarity(2), Association_Prior_Word(3) | Certainty(2), Similarity(2) |

TABLE 7-continued

Example of preposition senses (meanings) and their effects on prior and following words

| Preposition | Provides additional description in dimension | Effect_On_Prior_Noun/Verb | Effect_On_First_Following_Noun/Verb |
|---|---|---|---|
| about | When/Imminence | Relative_Timeline(−1), Synchronicity(−3) | Relative_Timeline(1), Synchronicity(−3) |
| above | Where | Height(3), Distance(3) | Height(−3), Distance(3) |
| according to | Why | Behavior_Controlled_By_Others(3), Understandability(3) | Behavior_Control_On_Others(3) |
| across | Where | Directionality(−2), Across(3), Association_Prior_Word(3) | Directionality(−2), Across(3) |
| after | When | Relative_Timeline(3), Synchronicity(−3) | Relative_Timeline(−3), Synchronicity(−3) |
| against | How | Affinity(−3), Directionality(−3), Association_Prior_Word(3) | Strength(−3), Affinity(−3), Directionality(−3) |
| ahead of | Where | Directionality(3), Ahead(3) | Directionality(3), Ahead(−3) |
| ahead of | When | Relative_Timeline(3), Synchronicity(−3) | Relative_Timeline(−3), Synchronicity(−3) |
| ahead of | How/Superiority | Strength(3) | Strength(−3) |
| along | Where | Directionality(3), Association_Prior_Word(3) | Directionality(3), Association(3) |
| alongside | Where | Directionality(3) | Directionality(3) |
| amid | Where | Centricity(3), Distance(−3) | Centricity(−3), Distance(−3), Quantity(3) |
| amidst | Where | Centricity(3), Distance(−3) | Centricity(−3), Distance(−3), Quantity(3) |
| among | Where | Centricity(3), Distance(−3) | Centricity(−3), Distance(−3), Quantity(3) |
| amongst | Where | Centricity(3), Distance(−3) | Centricity(−3), Distance(−3), Quantity(3) |
| around | Where/Circularity | Centricity(−3), Association(2), Distance(−2), Directionality(−3) | Centricity(3), Association(2), Distance(−2) |
| around | How/Approximation | Certainty(2), Similarity(2), Association_Prior_Word(3) | Certainty(2), Similarity(2) |
| as | How/Similarity | Similarity(3) | Similarity(3) |
| as | Why | Behavior_Controlled_By_Others(3), Understandability(3) | Behavior_Control_On_Others(3) |
| as | When | Synchronicity(3) | Synchronicity(3) |
| aside | Where | Distance(−2), Centricity(−5) | Distance(−3), Centricity(−5) |
| aside from | Disassociation/Exclusion | Association(−3), Association_Prior_Word(3) | Association(−3) |
| astride | Where | Height(3), Distance(−3) | Height(−3), Distance(−3) |
| at | Where | Distance(−3), Centricity(5) | Distance(−3), Centricity(5) |
| at | When | Synchronicity(3), Association_Prior_Word(3) | Synchronicity(3) |
| at | Association | Association_Prior_Word_(3) | Association(3) |
| athwart | Where | Directionality(−2), Across(3), Association_Prior_Word(3) | Directionality(−2), Across(3) |
| atop | Where | Height(3), Distance(−3) | Height(−3), Distance(−3) |
| barring | Disassociation/Exclusion | Association(−3), Association_Prior_Word(3) | Association(−3) |
| because | Why | Creation_Controlled_By_Others(3), Understandability(3) | Creation_Control_On_Others(3) |
| because of | Why | Creation_Controlled_By_Others(3), Understandability(3) | Creation_Control_On_Others(3) |
| before | When | Relative_Timeline(−3), Synchronicity(−3) | Relative_Timeline(3), Synchronicity(−3) |
| behind | Where | Directionality(3), Ahead(−3) | Directionality(3), Ahead(3) |
| behind | When | Relative_Timeline(3), Synchronicity(−3) | Relative_Timeline(−3), Synchronicity(−3) |
| behind | Why | Creation_Controlled_By_Others(3), Understandability(3) | Creation_Control_On_Others(3) |
| below | Where | Height(−3), Distance(3) | Height(3), Distance(3) |
| beneath | Where | Height(−3) | Height(3) |
| beside | Where | Distance(−2) | Distance(−2) |
| besides | And | AND | AND |
| between | Where | Distance(3), Centricity(−3) | Distance(3), Centricity(−3) |
| between | When | Synchronicity(3), Certainty(−3) | Synchronicity(3), Certainty(−3) |
| between | How_much/Range | Association(3), Range(2) | Association(3), Range(3) |
| between | How/Portion | Completeness_Of_Set(−3) | Association(3) |
| between | Association/Choice | Certainty(−3) | Certainty(3) |
| beyond | Where | Distance(4), Directionality(3) | Distance(3), Directionality(3) |
| beyond | When | Relative_Timeline(3), Synchronicity(−3) | Relative_Timeline(−3), Synchronicity(−3) |
| beyond | Association/Excess | Association_Prior_Word_(3) | Association(3) |
| but | Disassociation/Exclusion | Association(−3), Association_Prior_Word(3) | Association(−3) |
| by | Who/Activation_creation_execution | Creation_Controlled_By_Others(3), Understandability(3) | Creation_Control_On_Others(3) |
| by | Where | Distance(−2) | Distance(−2) |
| by | How/using | Behavior_Controlled_By_Others(3), Understandability(3) | Behavior_Control_On_Others(3) |
| by | When | Relative_Timeline(−3), Synchronicity(−2) | Relative_Timeline(3), Synchronicity(−2) |
| by | How_much | Quantity(1) | Association(3) |
| by | How_much/Multiplication | Size(1) | Association(3) |
| by | How/Thoroughness | Association_Prior_Word(3), Importance(3) | Association(3) |
| by means of | How/using | Behavior_Controlled_By_Others(3), Understandability(3) | Behavior_Control_On_Others(3) |
| circa | When | Certainty(2), Synchronicity(1) | Certainty(2), Synchronicity(1) |
| close to | Where | Distance(−2), Centricity(−2) | Distance(−2), Centricity(−2) |
| close to | When/Imminence | Relative_Timeline(−1), Synchronicity(−3) | Relative_Timeline(1), Synchronicity(−3) |

TABLE 7-continued

Example of preposition senses (meanings) and their effects on prior and following words

| Preposition | Provides additional description in dimension | Effect_On_Prior_Noun/Verb | Effect_On_First_Following_Noun/Verb |
|---|---|---|---|
| close to | How_much/Approximation | Certainty(2), Similarity(2), Association_Prior_Word(3) | Certainty(2), Similarity(2) |
| despite | How | Emphasis(3), Certainty(-3), Creation_Controlled_By_Others(-3) | Emphasis(3), Certainty(3), Creation_Control_On_Others(3) |
| down | Where | Height(-3), Directionality(3) | height(3), Directionality(3) |
| due to | Why | Creation_Controlled_By_Others(3), Understandability(3) | Creation_Control_On_Others(3) |
| during | When | Duration(2), Synchronicity(3) | Duration(3), Synchronicity(3) |
| except | Disassociation/Exclusion | Association(-3), Association_Prior_Word(3) | Association(-3) |
| except for | Disassociation/Exclusion | Association(-3), Association_Prior_Word(3) | Association(-3) |
| far from | Where | Distance(3) | Distance(3) |
| for | Association | Association_Prior_Word(3) | Association(3) |
| for | Why/Reason | Creation_Controlled_By_Others(3), Understandability(3) | Creation_Control_On_Others(3) |
| for | Why/In order to | Creation_Controlled_By_Others(3), Understandability(3) | Creation_Control_On_Others(3), Need(3) |
| for | Intended_to_get_close_to (intended Association) | Distance(3), Distance(-2), Association_Prior_Word(3) | Distance(3), Relative_Timeline(4), Distance(-2) |
| for | Duration | Duration(3), Association_Prior_Word(3) | Duration(3) |
| for | Length | Length(3), Association_Prior_Word(3) | Length(3) |
| for | Value | Value(3), Association_Prior_Word(3) | Value(3) |
| from | Where/Motion_Away_From | Distance(-3), Distance(3), Association_Prior_Word(3) | Distance(-3), Distance(3), |
| from | When/Since | Relative_Timeline(3), Synchronicity(-3), Duration(3) | Relative_Timeline(-3), Synchronicity(-3) |
| from | Why | Creation_Controlled_By_Others(3), Understandability(3) | Creation_Control_On_Others(3) |
| given | Why | Behavior_Controlled_By_Others(3), Understandability(3) | Behavior_Control_On_Others(3) |
| in | Where | Centricity(3), Distance(-3) | Centricity(3), Distance(-3), Size(3) |
| in | When | Duration(2), Synchronicity(3) | Duration(3), Synchronicity(3) |
| in | Association | Association_Prior_Word_(3) | Association(3) |
| in accordance with | How | Behavior_Controlled_By_Others(3), Understandability(3) | Behavior_Control_On_Others(3) |
| in addition to | And | AND | AND |
| in case of | Why | Creation_Controlled_By_Others(3), Understandability(3) | Creation_Control_On_Others(3) |
| in front of | Where | Directionality(3), Ahead(3) | Directionality(3), Ahead(-3) |
| in order to | Why/In order to | Association_Prior_Word(3) | Need (3) |
| in lieu of | Disassociation/Replacement | Association_Prior_Word(3) | Association(-3) |
| in place of | Disassociation/Replacement | Association_Prior_Word(3) | Association(-3) |
| in spite of | How | Emphasis(3), Certainty(-3), Creation_Controlled_By_Others(-3) | Emphasis(3), Certainty(3), Creation_Control_On_Others(-3) |
| in to | Where | Centricity(-3), Distance(3), Centricity(3), Distance(-3) | Centricity(3), Distance(-3), Size(3), Centricity(-3), Distance(3) |
| inside | Where | Centricity(3), Distance(-3) | Centricity(3), Distance(-3), Size(3) |
| inside | When | Synchronicity(3), Duration(2) | Synchronicity(3), Duration(3) |
| inside | Association | Association_Prior_Word_(3) | Association(3) |
| inside of | Where | Centricity(3), Distance(-3) | Centricity(3), Distance(-3), Size(3) |
| instead of | Disassociation/Replacement | Association_Prior_Word(3) | Association(-3) |
| into | Where | Centricity(-3), Distance(3), Centricity(3), Distance(-3) | Centricity(3), Distance(-3), Size(3), Centricity(-3), Distance(3) |
| like | How | Similarity(3) | Similarity(3) |
| mid | Where | Centricity(3), Distance(-3) | Centricity(-3), Distance(-3), Size(3) |
| mid | When | Synchronicity(3), Duration(2) | Synchronicity(3), Duration(3) |
| mid | Association | Association_Prior_Word_(3) | Association(3) |
| minus | Disassociation/Exclusion | Association(-3), Association_Prior_Word(3) | Association(-3) |
| near | Where | Distance(-2) | Distance(-2) |
| near to | Where | Distance(-2) | Distance(-2) |
| next | When/Sequence_position | sequence position(3) | Sequence_position(-3) |
| next to | Where | Distance(-2) | Distance(-2) |
| notwithstanding | How | Emphasis(3), Certainty(-3), Creation_Controlled_By_Others(-3) | Emphasis(3), Certainty(3), Creation_Control_On_Others(3) |
| of | Association | Association_Prior_Word(3) | Association(3) |
| off | Where | Distance(3) | Distance(3) |
| on | Where | Height(2), Distance(-3) | Height(-2), Distance(-3) |
| on | When | Synchronicity(3), Association_Prior_Word(3) | Synchronicity(3) |
| on | Association | Association_Prior_Word_(3) | Association(3) |
| on | When/Duration | Duration(3) | |
| on account of | Why | Creation_Controlled_By_Others(3), Understandability(3) | Creation_Control_On_Others(3) |

TABLE 7-continued

Example of preposition senses (meanings) and their effects on prior and following words

| Preposition | Provides additional description in dimension | Effect_On_Prior_Noun/Verb | Effect_On_First_Following_Noun/Verb |
|---|---|---|---|
| on behalf of | Why | Creation_Controlled_By_Others(3), Association_Prior_Word(3) | Creation_Control_On_Others(3) |
| on to | Where | Height(3), Distance(−3) | Height(−3), Distance(−3) |
| on top of | Where | Height(3), Distance(−3) | height(−3), Distance(−3) |
| onto | Where | Height(−1), Distance(2), Height(3), Distance(−3) | height(1), Distance(2), height(−3), Distance(−3) |
| opposite | Where | directionality(−3) | directionality(−3) |
| out | Where | Centricity(−3) | Centricity(−3) |
| out from | Where | Centricity(3), Centricity(−3), Association_Prior_Word(3) | Centricity(3), Centricity(−3) |
| out of | Where | Centricity(−3), Association_Prior_Word(3) | Centricity(−3) |
| out of | Why | Behavior_Controlled_By_Others(3), Understandability(3) | Behavior_Control_On_Others(3) |
| outside | Where | Centricity(−3), Association_Prior_Word(3) | Centricity(−3) |
| outside of | Where | Centricity(−3), Association_Prior_Word(3) | Centricity(−3) |
| over | Where | Height(3), Distance(−2) | height(−3), Distance(−2) |
| over | When | Synchronicity(3), Association_Prior_Word(3) | Synchronicity(3) |
| over | Association | Association_Prior_Word_(3) | Association(3) |
| owing to | Why | Creation_Controlled_By_Others(3), Understandability(3) | Creation_Control_On_Others(3) |
| past | Where | Distance(4), Directionality(3) | Distance(3), Directionality(3) |
| past | When | Relative_Timeline(3), Synchronicity(−3) | Relative_Timeline(−3), Synchronicity(−3) |
| past | Association | Association_Prior_Word_(3) | Association(3) |
| per | Association | Association_Prior_Word(3) | Association(3) |
| plus | And | AND | AND |
| prior to | When | Relative_Timeline(−3), Synchronicity(−3) | Relative_Timeline(3), Synchronicity(−3) |
| pursuant to | Why | Creation_Controlled_By_Others(3), Understandability(3) | Creation_Control_On_Others(3) |
| regarding | Association | Association_Prior_Word(3) | Association(3) |
| regardless of | How | Emphasis(3), Certainty(−3), Creation_Controlled_by_others(−3) | Emphasis(3), Certainty(3), Creation_Control_on_others(3) |
| round | Where | Centricity(−3), Association(2), Distance(−2), Directionality(−2) | Centricity(3), Association(2), Distance(−2) |
| since | When/Since | Relative_Timeline(3), Synchronicity(−3), Duration(3) | Relative_Timeline(−3), Synchronicity(−3) |
| subsequent to | When | Relative_Timeline(3), Synchronicity(−3) | Relative_Timeline(−3), Synchronicity(−3) |
| than | How much | Understandability(3), Association_Prior_Word(3) | Association(3), Understandability(3) |
| through | Where | Across(3), Centricity(3), Distance(−3) | Centricity(3), Distance(−3), Size(3) |
| through | When | Synchronicity(3), Duration(3), Association_Prior_Word(3) | Synchronicity(3), Duration(3) |
| through | Association | Association_Prior_Word_(3) | Association(3) |
| throughout | Where | Across(3), Centricity(3), Distance(−3), Completeness_of_individual(3) | Centricity(3), Distance(−3), Size(3) |
| throughout | When | Synchronicity(3), Duration(3), Association_Prior_Word(3) | Synchronicity(3), Duration(3) |
| throughout | Association | Association_Prior_Word_(3) | Association(3) |
| till | When/Till | Relative_Timeline(−3), Synchronicity(−3), Duration(3) | Relative_Timeline(3), Synchronicity(−3) |
| times | How much/Multiplication | Association_Prior_Word(3) | Association(3) |
| to | Where/Motion_towards | Distance(3), Distance(−3), Association_Prior_Word(3) | Distance(3), Distance(−3) |
| to | When/Till | Relative_Timeline(−3), Synchronicity(−3), Duration(3) | Relative_Timeline(3), Synchronicity(−3) |
| to | Why/In order to | Association_Prior_Word(3) | Need(3) |
| to | How_many/Multiplicity | Association_Prior_Word(3) | Association(3) |
| to | To_Infinitive | | |
| toward | Where | Distance(3), Distance(−2), Association_Prior_Word(3) | Distance(3), Distance(−2) |
| towards | Where | Distance(3), Distance(−2), Association_Prior_Word(3) | Distance(3), Distance(−2) |
| under | Where | Height(−2), Distance(−3) | Height(2), Distance(−3) |
| under | Association | Association_Prior_Word_(3) | Association(3) |
| underneath | Where | Height(−3) | Height(3) |
| unlike | Disassociation | Similarity(−3) | Similarity(−3) |
| until | When | Relative_Timeline(−3), Synchronicity(−3), Duration(3) | Relative Timeline(3), Synchronicity(−3) |
| up | Where | Height(3), Directionality(3) | Height(−3), Directionality(3) |
| upon | Where | Height(3), Distance(−3) | Height(−3), Distance(−3) |
| upon | When | Synchronicity(3), Association_Prior_Word(3) | Synchronicity(3) |
| upon | Association | Association_Prior_Word_(3) | Association(3) |
| versus | How | Strength(−3), Affinity(−3), Directionality(−3), Association_Prior_Word(3) | Strength(−3), Affinity(−3), Directionality(−3) |
| via | How | Directionality(3), Centricity(3), Distance(−3), Stability(−3) | Centricity(3), Distance(−3), Size(3) |

TABLE 7-continued

Example of preposition senses (meanings) and their effects on prior and following words

| Preposition | Provides additional description in dimension | Effect_On_Prior_Noun/Verb | Effect_On_First_Following_Noun/Verb |
|---|---|---|---|
| while | When | Duration(2), Synchronicity(3) | Duration(3), Synchronicity(3) |
| with | How/using | Behavior_Controlled_By_Others(3), Understandability(3) | Behavior_Control_On_Others(3) |
| with | Association | Association_Prior_Word(3) | Association(3) |
| with regard to | Association | Association_Prior_Word(3) | Association(3) |
| with respect to | Association | Association_Prior_Word(3) | Association(3) |
| within | Where | Centricity(3), Distance(−3) | Centricity(3), Distance(−3), Size(3) |
| within | When | Duration(2), Synchronicity(3) | Duration(3), Synchronicity(3) |
| within | Association | Association_Prior_Word_(3) | Association(3) |
| without | Disassociation/Exclusion | Association(−3), Association_Prior_Word(3) | Association(−3) |
| "s | Whose | Association(3) | Association_Prior_Word(3) |
| at the expense of | How | Association_Prior_Word_(3) | Strength(−3) |
| at the hands of | How | Creation_Controlled_By_Others(3), Understandability(3) | Creation_Control_On_Others(3) |
| at the mercy of | How | Behavior_Controlled_By_Others(3), Understandability(3) | Behavior_Control_On_Others(3) |
| in the name of | How | Behavior_Controlled_By_Others(3), Understandability(3) | Behavior_Control_On_Others(3) |
| by the name of | How | Behavior_Controlled_By_Others(3), Understandability(3) | Behavior_Control_On_Others(3) |
| under the name of | How | Behavior_Controlled_By_Others(3), Understandability(3) | Behavior_Control_On_Others(3) |
| by dint of | Why | Creation_Controlled_By_Others(3), Understandability(3) | Creation_Control_On_Others(3) |
| by virtue of | Why | Creation_Controlled_By_Others(3), Understandability(3) | Creation_Control_On_Others(3) |
| in line with | How | Behavior_Controlled_By_Others(3) | Behavior_Control_On_Others(3) |
| in proportion to | How | Behavior_Controlled_By_Others(3) | Behavior_Control_On_Others(3) |
| in proportion with | How | Behavior_Controlled_By_Others(3) | Behavior_Control_On_Others(3) |
| in the course of | When | Duration(2), Synchronicity(3) | Duration(3), Synchronicity(3) |
| in the light of | How | Awareness(3) | Awareness(3) |
| in the process of | How | Duration(2), Synchronicity(3) | Duration(3), Synchronicity(3) |
| in the space of | When | Duration(2), Synchronicity(3) | Duration(3), Synchronicity(3) |
| in tune with | How | Behavior_Controlled_By_Others(3), Understandability(3) | Behavior_Control_On_Others(3) |
| on pain of | How | Behavior_Controlled_By_Others(3), Understandability(3) | Behavior_Control_On_Others(3) |
| under pain of | How | Behavior_Controlled_By_Others(3), Understandability(3) | Behavior_Control_On_Others(3) |
| on account of | Why | Creation_Controlled_By_Others(3), Understandability(3) | Creation_Control_On_Others(3) |
| on the grounds of | Why | Creation_Controlled_By_Others(3), Understandability(3) | Creation_Control_On_Others(3) |
| on the point of | Association | Association_Prior_Word_(3) | Association(3) |
| on the stroke of | When | Synchronicity(3), Association_Prior_Word(3) | Synchronicity(3) |
| in step with | How | Behavior_Controlled_By_Others(3), Understandability(3) | Behavior_Control_On_Others(3) |
| out of step with | How | Behavior_Controlled_By_Others(−3), Understandability(−3) | Behavior_Control_On_Others(−3) |

Most verbs provide information about what change they cause on their object AFTER their effect takes place. For example, "John killed the bug" provides information that the bug was dead after John killed it. However, certain "controlling verbs" provide additional information about the state of the object BEFORE the verb effect as well as AFTER the verb effect. For example, "Tom started the engine" suggests that the engine was not energized before but was energized after the start happened. This can be correctly represented as "John<−>started[Strength(−3), Strength(+3)]<−>engine". The "Strength(−3)" implies the non-energized (i.e. not started) engine and the "Strength(+3)" implies the energized (i.e. started) engine. This allows correct answering of the indirect question "Was the engine shut (i.e., "engine [Strength(−3)]") before John started it?" as "yes", rather than "unknown". Other controlling verbs like "Stop, Continue, Halt, Remain, Discontinue, Conclude, Terminate, Cancel, Abort" provide an implicit description of the BEFORE state as well as an explicit description of the AFTER state; which are correctly depicted by two appearances of scales.

Multiple words present in the input text and their Scale-webs linking the words to each other can model even the most complex sentences into measurable relationships between the words. For example, sentences containing one or multiple AND, OR, BUTs can be modeled and analyzed to accurately answer questions. ANDs, ORs, BUTs cause a "coupling" node in the Scale-Webs where the main part of the sentence (the coupling stem) and the AND/OR/BUT "branches" meet. For example, the sentence "I met John and Tom" can be modeled correctly as "I<−>met[distance(−3)] <−>AND-STEM"+"AND-STEM <−>John[AND-BRANCH(+3)]"+"AND-STEM <−>Tom[AND-BRANCH(+3)]".

The aspect of Scales allows for interpreting conditionality. For example, "If it is cold tomorrow, I will drink coffee otherwise I will drink soda" can be correctly modeled as "is-cold [Condition_True(+3)]<–>Drink-coffee [Behavior_Controlled_By(+3)]" and "is-cold [Condition_False(+3)] <–> Drink-Soda [Behavior_Controlled_By(+3)]". This allows for "Logical Comprehension".

Scales allow compound verbs to link to each other with full fidelity of the semantic meaning. For example, "John tried to kill the bug" may be represented as "John<–>tried [Certainty(–3)]<–>to kill [Strength(–3)]<–>the bug". This will correctly NOT match the Scale links for the question "Did John kill the bug?" and the answer will be "Unknown". However, the question "Did John attempt to destroy the insect?" will correctly result in the answer "Yes", because the Scale-Web links will match.

Another aspect of the disclosed embodiments is the feature of correctly disambiguating and linking words in complex sentences using "Reasonability Checks", "Scale Intersect", "Comma Linkage Rules" and "Barrier Words". They are briefly explained below.

"Reasonability Checks" determine which nouns and which noun senses (meanings) can reasonably carry out a verb action described by a particular sense (meaning) of that verb. For example, the verb "to axe" can mean either "chop into pieces using a sharp tool" or "terminate". The noun "job" has several meanings, including "occupation" and "a sequence of computer programs executed as a single unit". So, in the sentence "Jobs carried out by temporary workers were axed."; only the meaning of the verb "axe" that means "terminate" can act only on the meaning of the noun "job" that means an "occupation". All other combinations of meanings of these two words are not reasonable. The disclosed embodiments may apply rules like the ones shown in Table—8 Verb-Noun Reasonability Rules to narrow down senses (meanings) of words in the input text and question.

TABLE 8

Verb-Noun Reasonability Rules

| Noun Lexical Type (Vertical) | Nouns denoting | Verb Lexical Type (Horizontal) | | | | | | | | | | | | | | |
|---|---|---|---|---|---|---|---|---|---|---|---|---|---|---|---|---|
| | | body | change | cognition | communication | competition | consumption | contact | creation | emotion | motion | perception | possession | social | stative | weather |
| Tops | unique beginner for nouns | | X | X | X | | | | X | | | X | X | | X | |
| act | acts or actions | | X | X | X | | | | X | | | X | | | X | |
| animal | animals | X | X | X | X | X | X | X | X | X | X | X | X | | X | |
| artifact | man-made objects | | X | X | X | X | | X | X | | X | X | X | X | X | |
| attribute | attributes of people and objects | | X | X | X | | | | X | X | | X | | | X | |
| body | body parts | X | X | X | X | X | X | X | X | | X | X | X | | X | |
| cognition | cognitive processes and contents | | X | X | X | | | X | X | | | | | | X | |
| communication | communicative processes and contents | | X | X | X | | | | X | | X | X | X | | X | X |
| event | natural events | | X | X | X | | | | X | | X | X | X | | X | |
| feeling | feelings and emotions | | X | X | X | | X | X | X | | X | X | | | X | |
| food | foods and drinks | | X | X | X | | | X | X | X | X | X | X | | X | |
| group | groupings of people or objects | | X | X | X | X | | X | X | | X | X | X | X | X | |
| location | spatial position | | X | X | X | | | X | X | | X | X | X | | X | |
| motive | goals | | X | X | X | X | | | X | | X | X | X | | X | X |
| object | natural objects (not man-made) | | X | X | X | X | | X | X | X | X | X | X | | X | |
| person | people | | X | X | X | X | X | X | X | X | X | X | X | X | X | X |
| phenomenon | natural phenomena | | X | X | X | | | | X | | X | X | X | | X | X |
| plant | plants | | X | X | X | | X | X | X | | X | X | X | | X | |
| possession | possession and transfer of possession | | X | X | X | | | | X | | X | X | X | X | X | |
| process | natural processes | | X | X | X | | | | X | | X | X | | | X | X |

TABLE 8-continued

Verb-Noun Reasonability Rules

| Noun Lexical | | Verb Lexical Type (Horizontal) | | | | | | | | | | | | | | |
|---|---|---|---|---|---|---|---|---|---|---|---|---|---|---|---|---|
| Type (Vertical) | Nouns denoting | body | change | cognition | communication | competition | consumption | contact | creation | emotion | motion | perception | possession | social | stative | weather |
| quantity | quantities and units of measure | | X | X | X | | | | X | X | X | | | | X | |
| relation | relations between people or things or ideas | | X | X | X | | | | X | | | X | | | X | |
| shape | two and three dimensional shapes | | | X | X | | | X | X | | X | X | | | X | |
| state | stable states of affairs | | X | X | X | | | | X | | | | | | X | |
| substance | substances | | X | X | X | | | X | X | | X | X | X | | X | X |
| time | time and temporal relations | | X | X | X | | | | | | | | X | | X | |

An "X" denotes a valid combination of a Verb-Lexical-Type and a Noun-Lexical-Type.

"Scale Intersect" rules further determine which nouns and verbs, and their sense, that may be indicated by the text author by using those specific words, for the text to make any useful sense to the reader. For example, in the sentence "The window is a good way for the cat to enter when it is open", it must refer to "window" because both the noun "window" (with definition "a framework built into a wall to allow passage of light and air") and the adjective "open" (with definition "allowing unobstructed access or passage") share the scale "Stability(−3)" (i.e., lack of stability, i.e., movement); i.e., their scales intersect or are common. But "cat" has the scale of "Existence(3)" and not "Stability(−3)", eliminating "cat" as a possible reference to it because the "Existence" and "Stability" scales do not intersect, i.e., are not common with each other.

"Comma Linkage Rules" indicate linkages of words following commas to other words that are not adjacent. For example, in the sentence "John saw the raccoon startled by the falling garbage bag", "startled" links to (i.e., describes) "raccoon". But simply by inserting a comma, the meaning changes, e.g., in "John saw the raccoon, startled by the falling garbage bag", "startled" links to (i.e., describes) "John". This is done by detecting the part-of-speech of words following each comma and applying related linking rules. An exemplary rule is "a present participle immediately following a comma links (i.e., provides additional description of) the subject of the main verb in the sentence". For example, in the sentence "The deflation reduced prices of most items needed for day to day living, affecting consumers.", "affecting" links to "deflation". This allows correct answering of the question "What affected consumers?" with "deflation".

"Barrier Words" may prevent linking of some or all words from left of them to words on the right and vice versa. For example, certain prepositions, depending on their usage (i.e., their sense or meaning in that sentence), act as barriers to other prepositions. For example, in the sentence "A delay was noted in most flights in the morning", "in the morning" links to "was noted" but in the sentence "A delay was noted except in most flights in the morning", the "except" acts as a barrier, preventing "in the morning" linking to "was noted", instead causing its correct link to "flights". For example, please see Table 9—Exemplary list of barrier prepositions for an exemplary list of barrier words, as set forth below:

TABLE 9

Exemplary list of barrier prepositions

About, according to, as, aside from, at, barring, because, because of, behind, between, beyond, but, due to, except, except for, for, from, given, in, in case of, in order to, in lieu of, in place of, inside, instead of, mid, minus, on, on account of, on behalf of, out of, over, owing to, past, per, pursuant to, regarding, through, throughout, to, under, unlike, upon, with, with regard to, with respect to, within, without, by dint of, by virtue of, on account of, on the grounds of, on the point, of These and other capabilities described in more detail later are the basis for the disclosed embodiments "Advanced Disambiguation and Linking" feature(s).

Question text may be processed in a similar manner to create a "Question scale Web" of words in the question and their scales linking to other words in the question. For example, please see Table 10—Example of Question-Scale-Web for an example of question sentences converted into the data model, which is an array consisting of rows and columns of data suitable for interrogation and manipulation in most typical programming languages using well-known programming techniques (e.g., using "select" methods of ADO.NET or LINQ in a Microsoft .NET programming environment). While processing each word in each sentence of the question, rows inserted from earlier question sentences in the same array are checked to see if a prior reference was found for the same object (e.g., "red car bought by John in July based on advice of his friend Tom"—all of this might have been described in one or multiple earlier question sentences) and an additional sub-array named "List of Unique Objects Detected in Question" is updated. For example, please see the bottom of Table 10—Example of Question-Scale-Web, as set forth below, for an example of the "List of Unique Objects Detected in Question" sub-array. Additionally, the "question focus" and "question intent" is determined. For example, for the question "In which city did John meet Tom?", the question focus is "in city" and question intent is "where", i.e., location. Every question word describes its question focus and question intent.

TABLE 10

Example of Question-Scale-Web
Exemplary question - "Does Mary have a large car?"

| Sentence Number | Serial Number From Text Sentence | Node Word | Node Part of Speech | Node Root Word | Scale | Scale Sign | Scale Value | Other Side Node Row Word |
|---|---|---|---|---|---|---|---|---|
| 1 | 1 | Mary | Noun | Mary | Verb subject | + | 3 | does have |
| 1 | 2 | does have | Verb | have | Verb_Subject | + | 3 | Mary |
| 1 | 2 | does have | Verb | have | Possession | + | 3 | |
| 1 | 2 | does have | Verb | have | Verb_Object | + | 4 | vehicle |
| 1 | 3 | large | Adjective | large | Adj_Linked_To | + | 3 | vehicle |
| 1 | 3 | large | Adjective | large | Size | + | 3 | vehicle |
| 1 | 4 | vehicle | Noun | vehicle | Vehicle | + | 3 | large |
| 1 | 4 | vehicle | Noun | vehicle | Vehicle | + | 3 | does have |

| Sentence Number | Serial Number From Text Sentence | Node Word | Other Side Node Row Serial Number | Other Side Node Row Part of Speech | Lexical Type | Synonyms and hypernym | Antonyms |
|---|---|---|---|---|---|---|---|
| 1 | 1 | Mary | 3 | Verb | noun.person | | |
| 1 | 2 | does have | 1 | Noun | verb.possession | own \| possess | |
| 1 | 2 | does have | | | verb.possession | own \| possess | |
| 1 | 2 | does have | 4 | Noun | verb.possession | own \| possess | |
| 1 | 3 | large | 4 | Adjective | adj.all | big | Small \| little |
| 1 | 3 | large | 4 | Adjective | adj.all | big | Small \| little |
| 1 | 4 | vehicle | 3 | Verb | noun.artifact | conveyance \| transport | |
| 1 | 4 | vehicle | 3 | Verb | noun.artifact | conveyance \| transport | |

List of Unique Objects Detected in Question

| Object | Object_Id | Sentence | Serial number from Question Sentence |
|---|---|---|---|
| Mary | QUO01 | 1 | 1 |
| vehicle | QUO02 | 1 | 4 |

The disclosed embodiments may then compare the words from the "Question Scale-Web" data model with the words from the "Text Scale-Web" data model, along with the scales describing the properties of each word and link, using well-known programming techniques (e.g., using "select" methods of ADO.NET or LINQ in a Microsoft .NET programming environment) to search the rows and columns of the two data model arrays to see if a match is found between objects mentioned in the question and the text (e.g., a "car" in the question is matched by a "car" in the text) and their relationships with each other as defined by the linking scales (e.g., is that car owned by Mary—indicated by scale "Possession(+3)"). Values in column "Other Side Node Row Serial Number" of Text-Scale-Web and Question-Scale-Web arrays allow finding related words within the sentence. Values in the column "Serial number from Text/Question Sentence" of the two related sub-arrays "List of Unique Objects Detected in Text" and "List of Unique Objects Detected in Question" allow finding other sentences referencing the same objects as in the current sentence being checked. The disclosed embodiments thus check for the values in the nodes and the scales between the nodes to evaluate semantic relationships described by the scales of verbs, adjectives, adverbs and prepositions across multiple sentences to answer the questions. Any question can be answered, e.g., does, did, is, who, when, where, why, by whom, to whom, whose, how, how much, how many, from whom, on what day . . . . , what happened on, after whose permission, in which house on the street leading to center of the town which John visited the earlier year did Mary meet Tom . . . etc. by detecting "Text Scale Web" nodes that satisfy the "question intent" and were NOT used to satisfy the semantic relationship of the "Question Scale-Web", because the question text, by definition, cannot contain the answer. For example, given the text "John had lunch at a restaurant" and the question "Where did John have lunch?", the words "at a restaurant" will not be in the question text, because that is what the question is trying to determine as an answer. The scales and other information kept at each node (e.g., the "Lexical Type") allow for the appropriate answer to be returned. For example, for a "where" question, all nodes related to the question focus word via scale "Distance" and having Lexical Type "Noun.Location, Noun.Object, Noun.Body or Noun.Artifact" are returned as the answer, because they are capable of describing a location (e.g., the preposition at has scales of "Distance(−3)" and "restaurant" is of lexical type "Noun.artifact"). Note that the answer may contain multiple pieces coming from multiple sentences. For example, given the text "John went to Boston. He met Tom. He had dinner at a nice restaurant" and the question "where did John have dinner?", the answer will return "at a nice restaurant, in Boston". While checking every linking point (i.e., "node") in either Scale-Web, the synonyms, hypernyms and antonyms are compared to see if a match exists or not (e.g., a "vehicle" in the question is matched by a "car" in the text, allowing the text "John's car is big" to satisfy the question "What size vehicle does John have?"). Additionally, other linked nodes are also checked to decide a match across the two Scale-Webs, depending upon the Scale providing that link. Note that a "match" may be found either by synonyms, hypernyms or other related attributes like troponyms, hyponyms etc. or by scale relationships.

For the text exemplified in Table 6—Example of Text-Scale-Web and the question exemplified in Table 10—Example of Question-Scale-Web, "Mary" from the question is matched by "Mary" in the second sentence of the text, "does have" from the question is matched by the Mary-related "bought" in the second sentence of the text (they share the scale "possession(+3)"); and "a large vehicle" from the question is matched by the "big" related to the "car" in the first sentence of the text. Additionally, the Unique Object list indicates that the car in the second sentence of text is the same object as the car in the first object in the text, allowing us to mix these matches to completely match the question, yielding the answer "Yes". If any of these matches were not successful, the answer would have been either a "no" or "unknown", depending upon the nature of unsatisfied matches.

A question may correctly result in "Unknown" as the answer, because no precisely matching reference was found in the text to the question nouns, their relationships with other nouns or actions mentioned in the question. A question may also result in "Possibly no", "Possibly yes", "Probably no" or "Probably yes", depending upon the levels of question details matched in the text (e.g., "a red car with black top" mentioned in the question may or may not be the "red car with white walled tires" mentioned in the text). Multiple answers may be returned correctly for questions matching multiple answers from the text. For example, the question "Who was taller than 5 feet at age 12?" may result in "John and Tom", as an answer, because both were described to be taller than 5 feet, using different ways of describing that in multiple sentences in the input text.

Questions may originate from a user via a client device or from another computer system. Questions and answers may be transformed to appropriate input/output media (e.g., the modalities of text, audio, video, gesture, tactile input and output etc.) or other signal forms by using intermediate technical layers. The justification for the answer (i.e., "Evidence Profiling") may be provided by returning with the answer the underlying supporting information, i.e., references to all nodes in all sentences (which may have originated in different source documents) in the input text that led to the answer. These advanced answering aspects of the present invention allow for the "Advanced Answering" capability.

Multiple questions may be asked and answered, targeted to the same input text. If needed, the "Input-Text-Scale-Web" data model may be saved in a permanent data store (e.g., relational database, file or XML) for future re-loading into memory to answer future questions, without needing to re-process the input text again.

Some Scale links are bidirectional (meaning either side node may find the other side node), while some are one-directional (meaning only one node will be allowed to find the other node). For example, "All mallards are ducks" is not the same as "All ducks are mallards".

Evaluating nodes connected to other nodes of potential interest allows for semantic equivalence between phrases like "the downtown hotel", "the hotel in downtown" and "the hotel located in center part of downtown" etc. but not with "the hotel located outside of downtown". Similarly, a single node for the noun "the problem" can be satisfied by a series of linked nodes for the phrase "the less than optimal situation" or vice versa.

The mechanisms of scales and the text/question Scale Webs, taken together, implement the "Discourse Intelligence" (i.e., multi-sentence meaning comprehension) in two ways:

(1) Detecting that subsequent sentences are referring to specific objects (nouns) already mentioned in MULTIPLE prior sentences:
   (a) For example, The red car on the top of the hill beyond the river is shiny. It is owned by John. The blue car at the top of the hill beyond the fence on the left is also shiny. It belongs to Mary. The car having the river between us and it is big. The car on the left is small. Mary bought her car with financial help from her father.—Whose car is big?"
   (b) This requires complex understanding across multiple sentences, made possible by the Scale-Web resulting from all sentences. The present invention will correctly detect that "the car beyond the river" and "the car having the river between us and it" are the same cars, based on the Scale "Sequence_Position" (i.e., location order between the narrator, river and car) matching for that car across the two sentences.
   (c) Additionally, this allows for parallel processing of large texts for improved performance and response to questions. For example, text from a large book or report can be simultaneously processed in parallel by multiple concentrated or distributed computers, each computer processing text from one chapter or one page of the book. Multiple references to the same unique object (e.g., "the red car bought in 2006 after John got his friend's favorable opinion about it") across multiple chapters or pages of the book are correctly detected and linked to each other by comparing the Scale-Webs of each car mentioned in the book. Similarly, multiple references to the same unique object can be correctly detected across multiple text source documents in parallel, allowing for answers derived from knowledge in multiple source documents.

(2) Allowing verbs from multiple sentences to act on the same unique objects (i.e., unique instance of a noun) to provide their effects on various scales in a time-sequenced cascading manner. This allows for the state of an object (noun) to be determined BEFORE and AFTER each sentence affecting that noun. This also allows for correctly finding input text sentences that are relevant to the chronological period that is mentioned in the question and for calculating the effects of the verbs on the nouns mentioned in the question.
   (a) As an example, assume the input text sentences are "Mary bought a car with red color. She financed it with a loan from the bank. She painted it blue. She hates the car but needs it to go to work." If the question is "DOES Mary (i.e., currently) have a red car?, the present invention will calculate effects of all sentences and consider the ending state of nouns mentioned in the question (Mary and car) and correctly respond with "No" (because the latest color scale linked to the car is "Car<->Blue(+3)"—caused by "painted"). However, if the question is "DID Mary (i.e., in the past) have a red car?", the present invention will look at the effect of each sentence on the nouns mentioned in the question (Mary and car) and correctly respond with "Yes" (because there is also an earlier reference in the Scale-Web "Car<->Red(+3)"). This ability of correctly processing multi-sentence comprehension has been a crucial gap in all prior art, now filled with the present invention.

Yet another unique approach of the disclosed embodiments deriving inferences to detect references to prior objects and to answer indirect questions not referring directly to input text. The disclosed embodiments may handle this by allowing scales to affect each other using pre-set rules that mirror laws of nature ("Inference from Laws of Nature" or "common sense"). As an example, a pre-set law of nature true anywhere anytime is that when anything happens faster, it requires less time. Using the well-known mathematical symbol "=>" to mean "implies", this rule can be modeled using scales as [Speed(+)]=> [Duration(−)]. Hence:

(1) "The car that sped up" is the same car that was referred in a subsequent sentence as the car that arrived sooner; and (2) If the input text is "I speeded up the car"—("speeded up" having scale [Speed(+3)]).

And the question is "was I in a hurry?"—("hurry" having [duration(−3)])—the disclosed embodiments may correctly reply with "yes", because it knows any change into a value in scale "[Speed( )]" affects the value of the scale "[Duration( )]" in an inverse manner.

This feature allows for "common sense" intelligence to be infused, making the answers more human-like and more practically useful. For example, please see Table 11—Exemplary list of scales affecting each other, as set forth below:

This list is just an example; scales can be added or removed at will and the disclosed embodiments may be told to re-learn the dictionaries and encyclopedias using the new scales by re-processing the word, synonyms and hypernyms. The scale relationships can be changed at will, as more scales are added.

This feature facilitates very indirect but correct answering. Some examples include:

(1) [Distance(+)]=>[Understandability(−)];
  (a) i.e., anything that is far is less understandable, both in a literal and figurative manner;
(2) [Quantity(+)]=>[Need(−)];
  (a) i.e., if you have more of something, less you will need it, both in a literal and figurative manner;
(3) [Timeline(+)]=>[Certainty(−)];
  (a) i.e., events in the past (denoted by Timeline(−)) are more certain than events in the future (denoted by Timeline(+)); and
(4) [Size(+)]=>[Awareness(+)];
  (a) i.e., anything that is bigger is more noticeable.

The features that may define "Dependent Scales" allows for very meaningful general summaries (gist) to be generated, by looking for sentences that contain words with effects from multiple sentences accumulating to the scale "[Importance(+3)]" or higher. The "Importance" Scale is in turn is dependent upon other Scales like "Strength" and "Emphasis", which are in turn dependent upon other scales. Gists can also be generated in any particular object types and scales that the user requests:

(1) For example, gist with a slant "monetary compensation, Size(+)", a summary description of only high salaries, bonuses etc. described in the totality of input text; and (2) For example, gist with a slant "armament, Speed(+) and Timeline(+)", a summary description of only fast armaments in the future (e.g. a new missile launch, a new tank design etc.). The speed may be described by words like "fast, supersonic" etc. or by short time, e.g., "takes less than 30 seconds to reach the desired altitude; capable of reaching enemy positions before the enemy radar can detect," etc.

TABLE 11

Exemplary list of scales affecting each other*

| Controlling Scale (Down) | Duration | Speed | Goodness/ Happiness | Strength | Range | Quality/ skill/ Grace | Quantity/ Count/ Existence/ Instantiation | Activation | Size | Distance |
|---|---|---|---|---|---|---|---|---|---|---|
| Duration | | | | | Same | | | | | Same |
| Speed | Opposite | | | Same | Same | | | | | Same |
| Goodness/Happiness | | | | | | | | | | |
| Strength/Support | | | Same | | Same | | | | | |
| Range (of influence) | | | | Same | | | | | | Same |
| Quality/Skill/Grace | | | | Same | | | | | | |
| Quantity/Count/ Existence/ Instantiation | | | | Same | | | | | | |
| Activation (Happen) | | | | | | | | Same | | |
| Size | | | | Same | | | | | | |
| Distance (between two things) | Same | | | Opposite | | | Opposite | | | |

*e.g., when something increases in speed, it has an opposite effect on its duration, i.e. it takes less time, and when something increases in strength, it has a larger range, i.e. its effects are felt over a wider area.

This in turn enables other applications of the disclosed embodiments, like SPAM or Advertising detection, in any electronic media by comparing the gists with "expected information thread" gists. A "Medicine XYZ cheap prices" gist will not match expected, valid information thread gist like "Deployment new servers".

Another unique feature of the disclosed embodiments is that the usage of scales also allow for freedom from specific language syntax. Though the examples in this writing are using English sentences, the underlying semantic comprehension mechanism works equally well with any language. This feature provides for correct semantic equivalence determination using input text in multiple languages. Similarly, the question can be in a different language than the input text language. This is because the semantic representation is just a set of numbers (scale values) linked to each other via a Scale-web in the program's memory, completely independent of original input text language and question language. Thus, the words "big" in English, "बड़ा" in Hindi and "大" in Traditional Chinese; all result in scale "Size(+3)", providing identical semantic representation regardless of language.

Yet another unique feature of the disclosed embodiments is that they may learn new words/concepts never encountered before by looking up the words in a digital dictionary (local or on the Web). The disclosed embodiments may look up the definition string for a new word in the digital dictionary and as long as the words in the definition string were known and had been filled with their own scale values in the database, it will correctly use the definition words Scale-Web to answer the question. For example, assume that the disclosed embodiments had never encountered the word "request". One or more of the embodimetns may look up the definition: "Request (noun)—the act of asking for something, especially as a favor" and convert it to the natural language sentence "Request is the act of asking for something, especially as a favor" and include it temporarily in the input text on the fly. As long as the database has the scale values for each word in the definition (i.e., act, ask, something, especially, favor), it will correctly find earlier references to the request and correctly answer questions referring to the request. This allows for "Vocabulary Learning".

Similarly, the disclosed embodiments may electronically refer to digital encyclopedias (either online on the Internet or local) to augment input text with "background knowledge" information. For example, if the input text is "Moscow is cold today" and "Moscow" was an unknown word, the present invention will electronically look up "Moscow", in say Wikipedia.org, ("Moscow is the capital city and the most populous federal subject of Russia. It is a major political, economic, cultural and scientific center in Russia and in Europe.") and find out that it is a large city and it inherits all attributes of a city, e.g., large population in a concentrated area. New information from encyclopedias (referred to as "World Knowledge Learning" in linguistics) is treated just like input text and undergoes the same processing, including "conditionality", e.g., from Wikipedia "Abortion, when induced in the developed world in accordance with local law, is among the safest procedures in medicine."

Knowledge represented as lists or tables may be utilized by converting it into natural language sentences. For example, a table representing "Cars for Sale" having columns "Make", "Model" "Year" with two rows with example data "Toyota/Camry/2004" and "Ford/Fusion/2009" in those columns can be represented as natural language sentences "Car for sale one is of make Toyota, of model Camry, of year 2004. Car for sale two is of make Ford, of model Fusion, of year 2009". Once created by a very simple converter program, these new sentences are correctly processed by the present invention as valid natural language sentences.

Yet a further unique feature of the disclosed embodiments is the ability to "model" a virtual world or scenario to try out "what-if" scenarios at will ("Context Switching"). This is done by changing the "World Knowledge" temporarily for the simulation. For example, let's say normally "water is heavier than air", but to simulate a world where "air is heavier than water", all we need to do is include the sentence "Air is heavier than water" as part of "Temporary World Knowledge", which can be any text containing medium, like a text file. The disclosed embodiments may apply that knowledge to all other text and answer questions accordingly. This feature may have one or more affects on simulations of all types.

Another way this "Virtual World Modeling" feature may be used is to "think" like someone else. For example, let's say a democratic nation is dealing with a neighboring dictatorship about a real or imaginary border issue. They can simply include the sentence "I (i.e., the present invention's logic capability) am a dictator" in the "Temporary World Knowledge". All other text may then be viewed from the view of a dictator; "Dictator" further being characterized by reliable sources like an encyclopedia (e.g., from Wikipedia.Org->Dictatorships are often characterized by some of the following traits: suspension of elections and of civil liberties; proclamation of a state of emergency; rule by decree; repression of political opponents without abiding by rule of law procedures; these include single-party state, and cult of personality.). Different locations and times may be virtually simulated by including them as sentences in the "Temporary World Knowledge". This feature may also have an affect on the awareness of how different views, cultures and social value-systems will or did look at a given situation.

Another unique feature of the disclosed embodiments is that they may not need or depend on probabilistic statistical or heuristic "prior training" or "machine learning" approaches for semantic comprehension. The various disclosed embodiments may use a deterministic approach for semantic comprehension, leading to higher accuracy in comprehension and question answering.

Referring to FIGS. 3-7, there is shown an exemplary series of screen captures illustrating how a user may enter free text (e.g., either written, spoken, and/or a combination thereof) into, for example, a text box (as indicated by the arrow) of a computer program implementing various aspects of the present invention (e.g., see FIGS. 3-4), then enter a free form question into, for example, a question box (as indicated by the arrow) of the computer program (e.g., see FIG. 5), then actuating, for example, an "answer question" key/button/function (as indicated by the arrow) of the computer program (e.g. see FIG. 6), and then receiving an answer to the posed question displayed in, for example, an answer box (as indicated by the arrow) of the computer program (e.g., see FIG. 7). In this manner, the computer program implementing various aspects of the present invention has processed the input text, regardless of format and/or complexity, processed a question regarding the input text, again regardless of format and/or complexity, and provided a cogent and direct answer that is fully accurate and directly responsive to the question asked.

As these and other variations and combinations of the features discussed above can be utilized without departing from the present invention as defined by the claims, the foregoing description of the embodiments should be taken by way of illustration rather than by way of limitation of the present invention as defined by the claims. It will also be understood that the provision of examples of the present invention (as well as clauses phrased as "such as," "e.g.,", "i.e.," "including" and the like) should not be interpreted as limiting the present invention to the specific examples; rather, the examples are intended to illustrate only some of many possible embodiments.

What is claimed is:

1. A method for natural language processing, comprising the steps of:
providing a parallel computer processing system performing the natural language processing, wherein the system is configured to simultaneously perform the natural language processing on multiple sources of text, wherein the system comprises a plurality of computer systems, wherein each computer system comprises:
a computer processor unit; and
a non-transitory computer readable medium operably associated with the computer processor unit, the non-transitory computer readable medium storing instructions executable by the computer processor unit to perform the steps of:
receiving input text, the input text comprising a first plurality of words;
applying a predetermined scale to the received input text to obtain a semantic relationship scale-web of the received input text;
disambiguating the received input text into a second plurality of words;
linking the second plurality of words based on the disambiguation;
applying a predefined common sense rule to the predetermined scale to modify the semantic relationship scale-web; and
providing an answer to a question regarding the received multiple sources of input text based on the modified semantic relationship scale-web linking, or the application of the predefined common sense rule.

2. The method according to claim 1, wherein when the input text further comprises a conditional statement, further comprising the steps of;
applying a predetermined scale to the received input text to obtain a conditional semantic relationship scale-web based on the conditional statement; and
providing an answer to a question regarding the conditional statement based on the obtained conditional semantic relationship scale-web.

3. The method according to claim 1, further comprising the steps of:
identifying that at least one word of the plurality of words is an unknown word;
referencing an information source to obtain a meaning of the at least one word; and
incorporating the meaning of the at least one word into the received input text.

4. The method according to claim 1, further comprising the steps of:
determining a first fact from the received input text based on a first context, the first context defined by a plurality of rules;
altering at least one rule of the plurality of rules to obtain a second context, the second context being different than the first context;
determining a second fact from the received input text based on the second context; and
providing an answer to a question regarding the input text based on the first fact and the second fact.

5. The method according to claim 1, wherein the input text, question or answer can be written or spoken in any language.

6. The method according to claim 1, wherein the answer comprises an encrypted message.

7. The method according to claim 1, wherein the disambiguating step permits the detection of unsolicited electronic messages contained in the input text.

8. The method according to claim 1, wherein the input text is selected from the group consisting of a plurality of free form spoken words, a plurality of free form written words, and combinations thereof.

9. A method for natural language processing, comprising the steps of:
providing a parallel computer processing system performing the natural language processing, wherein the system is configured to simultaneously perform the natural language processing on multiple sources of text, wherein the system comprises a plurality of computer systems, wherein each computer system comprises:
a computer processor unit; and
a non-transitory computer readable medium operably associated with the computer processor unit, the non-transitory computer readable medium storing instructions executable by the computer processor unit to perform the steps of:
receiving an input text, the input text comprising a plurality of sentences;
applying a plurality of predetermined scales to the plurality of sentences to obtain a semantic relationship scale-web of the input text, wherein the semantic relationship scale-web of the input text links the words of the plurality of sentences;
applying a predefined common sense rule to the plurality of predetermined scale to modify the semantic relationship scale-web; and
providing an answer to a question regarding the multiple sources of input text, the answer being based on the modified semantic relationship scale-web of the multiple sources of input text, or the application of the predefined common sense rule.

10. The method according to claim 9, wherein when the input text further comprises a conditional statement, further comprising the steps of:
applying a predetermined scale to the received input text to obtain a conditional semantic relationship scale-web based on the conditional statement; and
providing an answer to a question regarding the conditional statement based on the obtained conditional semantic relationship scale-web.

11. The method according to claim 9, further comprising the steps of:
identifying that at least one word of the plurality of words is an unknown word;
referencing an information source to obtain a meaning of the at least one word; and
incorporating the meaning of the at least one word into the received input text.

12. The method according to claim 9, further comprising the steps of:
determining a first fact from the received input text based on a first context, the first context defined by a plurality of rules;
altering at least one rule of the plurality of rules to obtain a second context, the second context being different than the first context;

determining a second fact from the received input text based on the second context; and providing an answer to a question regarding the input text based on the first fact and the second fact.

13. The method according to claim 9, wherein the input text, question or answer can be written or spoken in any language.

14. The method according to claim 9, wherein the answer comprises an encrypted message.

15. The method according to claim 9, wherein the step of applying the plurality of predetermined scales to the plurality of sentences to obtain the scale-web of the input text permits the detection of unsolicited electronic messages contained in the input text.

16. The method according to claim 9, wherein the input text is selected from the group consisting of a plurality of free form spoken words, a plurality of free form written words, and combinations thereof.

17. A method for natural language processing, comprising the steps of:
- providing a parallel computer processing system performing the natural language processing, wherein the system is configured to simultaneously perform the natural language processing on multiple sources of text, wherein the system comprises a plurality of computer systems, wherein each computer system comprises:
- a computer processor unit; and
- a non-transitory computer readable medium operably associated with the computer processor unit, the non-transitory computer readable medium storing instructions executable by the computer processor unit to perform the steps of:
- receiving an input text comprising a plurality of words;
- receiving an input question regarding the received input text;
- applying a first scale to the received input text to obtain a first semantic relationship scale-web of the input text;
- applying a second scale to the received input question to obtain a second semantic relationship scale-web of the input question;
- applying a predefined common sense rule to the first and second scales to modify the first and second semantic relationship scale-web; and
- providing an answer to the received input question based on a comparison of the modified first semantic relationship scale-web of the multiple sources of input text with the modified second semantic relationship scale-web of the multiple sources of input text, or the application of the predefined common sense rule.

18. The method according to claim 17, wherein when the input text further comprises a conditional statement, further comprising the steps of:
- applying a predetermined scale to the received input text to obtain a conditional semantic relationship scale-web based on the conditional statement; and
- providing an answer to a question regarding the conditional statement based on the obtained conditional semantic relationship scale-web.

19. The method according to claim 17, further comprising the steps of:
- identifying that at least one word of the plurality of words is an unknown word;
- referencing an information source to obtain a meaning of the at least one word; and
- incorporating the meaning of the at least one word into the received input text.

20. The method according to claim 17, further comprising the steps of:
- determining a first fact from the received input text based on a first context, the first context defined by a plurality of rules;
- altering at least one rule of the plurality of rules to obtain a second context, the second context being different than the first context;
- determining a second fact from the received input text based on the second context; and
- providing an answer to a question regarding the input text based on the first fact and the second fact.

21. The method according to claim 17, wherein the input text, question or answer can be written or spoken in any language.

22. The method according to claim 17, wherein the answer comprises an encrypted message.

23. The method according to claim 17, wherein the disambiguating step permits the detection of unsolicited electronic messages contained in the input text.

24. The method according to claim 17, wherein the input text is selected from the group consisting of a plurality of free form spoken words, a plurality of free form written words, and combinations thereof.

* * * * *